United States Patent
Guo et al.

(10) Patent No.: US 11,935,246 B2
(45) Date of Patent: Mar. 19, 2024

(54) SYSTEMS AND METHODS FOR IMAGE SEGMENTATION

(71) Applicant: SHANGHAI UNITED IMAGING HEALTHCARE CO., LTD., Shanghai (CN)

(72) Inventors: Yanen Guo, Shanghai (CN); Jianhua Shen, Shanghai (CN); Xiaodong Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 93 days.

(21) Appl. No.: 17/454,053

(22) Filed: Nov. 8, 2021

(65) Prior Publication Data
US 2022/0058806 A1  Feb. 24, 2022

Related U.S. Application Data

(63) Continuation of application No. 16/674,172, filed on Nov. 5, 2019, now Pat. No. 11,170,509, which is a
(Continued)

(51) Int. Cl.
*G06T 7/12* (2017.01)
*G06T 3/00* (2006.01)
(Continued)

(52) U.S. Cl.
CPC .......... *G06T 7/149* (2017.01); *G06T 3/0006* (2013.01); *G06T 7/12* (2017.01); *G06T 7/13* (2017.01);
(Continued)

(58) Field of Classification Search
CPC ..................................................... G06T 7/149
See application file for complete search history.

(56) References Cited

U.S. PATENT DOCUMENTS

2010/0195881 A1\* 8/2010 Orderud .................. G06T 7/277
  382/131
2010/0259546 A1\* 10/2010 Yomdin .................... G06T 7/12
  345/473
(Continued)

FOREIGN PATENT DOCUMENTS

| CN | 103310449 A | 9/2013 |
|---|---|---|
| CN | 105719278 A | 6/2016 |
| CN | 105976384 A | 9/2016 |

OTHER PUBLICATIONS

J. Peters et al., Segmentation of the Heart and Major Vascular Structures in Cardiovascular CT Images. SPIE Medical Imaging, 6914: 691417-1-691417-12, 2008.

Zheng, Yefeng et al., Four-chamber Heart Modeling and Automatic Segmentation for 3-D Cardiac CT Volumes Using Marginal Space Learning and Steerable Features. IEEE Transactions on Medical Imaging, 27(11): 1668-1681, 2008.

(Continued)

*Primary Examiner* — Oneal R Mistry
(74) *Attorney, Agent, or Firm* — METIS IP LLC

(57) ABSTRACT

The present disclosure relates to an image processing method. The method may include: obtaining image data; reconstructing an image based on the image data, the image including one or more first edges; obtaining a model, the model including one or more second edges corresponding to the one or more first edges; matching the model and the image; and adjusting the one or more second edges of the model based on the one or more first edges.

17 Claims, 25 Drawing Sheets

Related U.S. Application Data continuation of application No. PCT/CN2017/083184, filed on May 5, 2017.

(51) Int. Cl.
  *G06T 7/13* (2017.01)
  *G06T 7/149* (2017.01)
  *G06T 11/00* (2006.01)

(52) U.S. Cl.
  CPC .. *G06T 11/003* (2013.01); *G06T 2207/10081* (2013.01); *G06T 2207/20061* (2013.01); *G06T 2207/20076* (2013.01); *G06T 2207/30012* (2013.01); *G06T 2207/30016* (2013.01); *G06T 2207/30048* (2013.01); *G06T 2207/30056* (2013.01); *G06T 2207/30084* (2013.01)

(56) References Cited

U.S. PATENT DOCUMENTS

| | | | | |
|---|---|---|---|---|
| 2016/0012596 | A1* | 1/2016 | Stehle | G06T 7/75 382/173 |
| 2016/0063726 | A1 | 3/2016 | Wenzel et al. | |
| 2019/0035099 | A1* | 1/2019 | Ebrahimi Afrouzi | G06T 17/05 |
| 2019/0333271 | A1* | 10/2019 | Nakagawa | G06T 17/205 |

OTHER PUBLICATIONS

Olivier Ecabert et al., Automatic Model-Based Segmentation of the Heart in CT Images. IEEE Transactions on Medical Imaging, 27(9): 1189-1201, 2008.

Tu, Zhuowen, Probabilistic Boosting-tree: Learning Discriminative Models for Classification, Recognition, and Clustering. Tenth IEEE International Conference on Computer Vision, 2005, 8 pages.

T.F. Cootes et al., Active Shape Models—Their Training and Application. Computer Vision and Image Understanding, 61(1): 38-59, 1995.

Ling, Huaqiang et al., Application of Active Shape Model in Segmentation of Liver CT Image. Journal of Zhejiang University of Technology, 40(4): 451-452, 2012.

International Search Report in PCT/CN2017/083184 dated Jan. 31, 2018, 7 pages.

Written Opinion in PCT/CN2017/083184 dated Jan. 31, 2018, 8 pages.

Heike Ruppertshofen et al., Discriminative generalized Hough transform for object localization in medical images, International Journal of Computer Assisted Radiology and Surgery, 8(4): 593-606, 2013.

The Extended European Search Report in European Application No. 17908558.4 dated Jan. 21, 2020, 6 pages.

* cited by examiner

SYSTEMS AND METHODS FOR IMAGE SEGMENTATION

CROSS-REFERENCE TO RELATED APPLICATIONS

This application is a Continuation of U.S. application Ser. No. 16/674,172 filed on Nov. 5, 2019, which is a Continuation of International Application No. PCT/CN2017/083184, field on May 5, 2017, the contents of which is incorporated herein by reference.

TECHNICAL FIELD

The present disclosure relates to methods and systems for image processing, in particular to methods and systems for image matching and segmentation based on a probability.

BACKGROUND

With the improvement of human living standards and the prolongation of life expectancy, cardiovascular disease has become the leading cause of death in humans. Therefore, early diagnosis of cardiovascular disease may effectively reduce the mortality rate. Understanding the imaging performances and function data of cardiac structure is an important prerequisite for the correct diagnosis of the cardiovascular disease. The development of computed tomography (CT) technology has significantly improved the time resolution, reduced the heartbeat artifacts, and showed a good application potential in displaying the fine structure of the heart.

Image segmentation is a key technology in image analysis, which plays an increasingly important role in imaging medicine. Image segmentation is an indispensable means to extract quantitative information of special tissues in images and is also a pre-processing step and premise for visualization. Segmented images are widely used in a variety of applications, such as quantitative analysis of tissue volume, diagnoses, localization of diseased tissues, learning of anatomical structures, treatment planning, local body effect correction of functional imaging data, and computer-guided surgeries.

After a CT image is reconstructed, it is necessary to locate and identify the cardiac chamber on the CT image. The positioning and identification of the cardiac chamber requires the detection of heart edge. A variable model is commonly used in the field of segmentation of cardiac chamber. A cardiac chamber model (i.e., the variable model) corresponds to average image data of multiple sets of clinical cardiac chamber models. The matched image is obtained by matching the cardiac chamber model with the image.

SUMMARY

According to one aspect of the present disclosure, a method is disclosed. The method may include: obtaining image data; reconstructing an image based on the image data, wherein the image includes one or more first edges that have a plurality of points; obtaining a model, wherein the model includes one or more second edges corresponding to the one or more first edges; matching the model and the image; and adjusting the one or more second edges of the model based on the one or more first edges.

In some embodiments, the image data may include a brain image, a skull image, a chest image, a cardiac image, a breast image, an abdominal image, a kidney image, a liver image, a pelvic image, a perineal image, a limb image, a spine image, or a vertebral image.

In some embodiments, the obtaining a model may include obtaining a plurality of reference models; registering the plurality of reference models; determining a plurality of control points on the plurality of reference models after the registration; obtaining a control point of the model based on a plurality of control points on the plurality of reference models; and generating the model based on the control point of the model.

In some embodiments, the method may further include generating a correlation factor of the control point of the model based on a relationship between the control point of the model and the one or more second edges of the model.

In some embodiments, the adjusting one or more second edges of the model may include determining a reference point on the second edge; determining an object point corresponding to the reference point; and adjusting the one or more second edges of the model based on the object point.

In some embodiments, the determining an object point corresponding to the reference point may include determining a normal of the reference point; obtaining a step size and a search range; determining one or more candidate points along the normal based on the step size and the search range; obtaining a first classifier; determining a probability that the one or more candidate points correspond to the first edge based on the first classifier; and determining the object point based on the probability that the one or more candidate points correspond to the first edge.

In some embodiments, the determining the normal of the reference point may include determining one or more polygon grids adjacent to the reference point; determining one or more normals corresponding to the one or more polygon grids; and determining the normal of the reference point based on the one or more normals.

In some embodiments, the matching the model and the image may include obtaining a second classifier; performing a weighted Generalized Hough Transform based on the second classifier; and matching the model and the image based on a result of the weighted Generalized Hough Transform.

In some embodiments, the obtaining the first classifier may include obtaining a point classifier, wherein the point classifier classifies a plurality of points of the first edge based on image features related to sharpness and location; obtaining the plurality of classified points by the point classifier, wherein at least a portion of the plurality of classified points are within a certain range of the first edge; determining a plurality of classified points within the certain range of the first edge as positive samples; determining a plurality of classified points outside the certain range of the first edge as negative samples; classifying the positive samples and the negative samples; and obtaining the first classifier based on the classified positive samples and the classified negative samples.

In some embodiments, the obtaining a second classifier may include obtaining a plurality of points of the model, wherein at least a portion of the plurality of points are within a certain range of the second edge; determining a plurality of points within the certain range of the second edge as positive samples; determining a plurality of points outside the certain range of the second edge as negative samples; classifying the positive samples and the negative samples based on the sharpness and location; and obtaining the second classifier based on the classified positive samples and the negative samples.

According to another aspect of the present disclosure, a system is disclosed. The system may include a storage configured to store data and instructions, and a processor in communication with the storage. When executing the instruction in the storage, the processor may be configured to obtain image data; reconstruct an image based on the image data, wherein the image includes one or more first edges that have a plurality of points; obtain a model, wherein the model includes one or more second edges corresponding to the one or more first edges; match the model with the image; and adjust the one or more second edges of the model based on the one or more first edges.

According to another aspect of the present disclosure, a non-transitory computer-readable medium having computer programs is disclosed. The computer program product may include a plurality of instructions. The plurality of instructions may be configured to perform a method: the method includes: obtaining image data; reconstructing an image based on the image data, wherein the image includes one or more first edges that have a plurality of points; obtaining a model, wherein the model includes one or more second edges corresponding to the one or more first edges; matching the model and the image; and adjusting the one or more second edges of the model based on the one or more first edges.

BRIEF DESCRIPTION OF THE DRAWINGS

In order to illustrate the technical solutions related to some embodiments of the present disclosure, brief descriptions of the drawings used in the present disclosure are provided below. Obviously, drawings described below are only some examples or embodiments of the present disclosure. Those having ordinary skills in the art, without further creative efforts, may apply the present disclosure to other similar scenarios according to the drawings. Unless stated otherwise or obvious from the context, the same reference numeral in the drawings refers to the same structure and operation.

DETAILED DESCRIPTION

As used in the disclosure and the appended claims, the singular forms "a," "an," and "the" may be intended to include the plural forms as well, unless the context clearly indicates otherwise. It will be further understood that the terms "include" and/or "comprise," when as used herein, specify the presence of operations and/or elements, but do not exclude the presence or addition of one or more other operations and/or elements thereof. The term "based on" is "based at least in part on." The term "one embodiment" means "at least one embodiment;" the term "another embodiment" means "at least one additional embodiment." The relevant definitions of other terms will be given in the description below.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

The present disclosure relates to a process of image segmentation, which matches an edge of an image based on a probability and transforms an edge point of a model based on a grid model of a correlation factor to achieve an accurate matching or segmentation. The matching of a medical image may include seeking one or more spatial transformations for the medical image to make the medical image spatially consistent with corresponding points on the model. The consistency may include the same anatomical point on the human body having the same spatial position on the matched image and model. The matching may result in a match between all anatomical points on the image and/or all diagnostically significant anatomical points and points of interest (POI) for the surgery.

Figure 1:
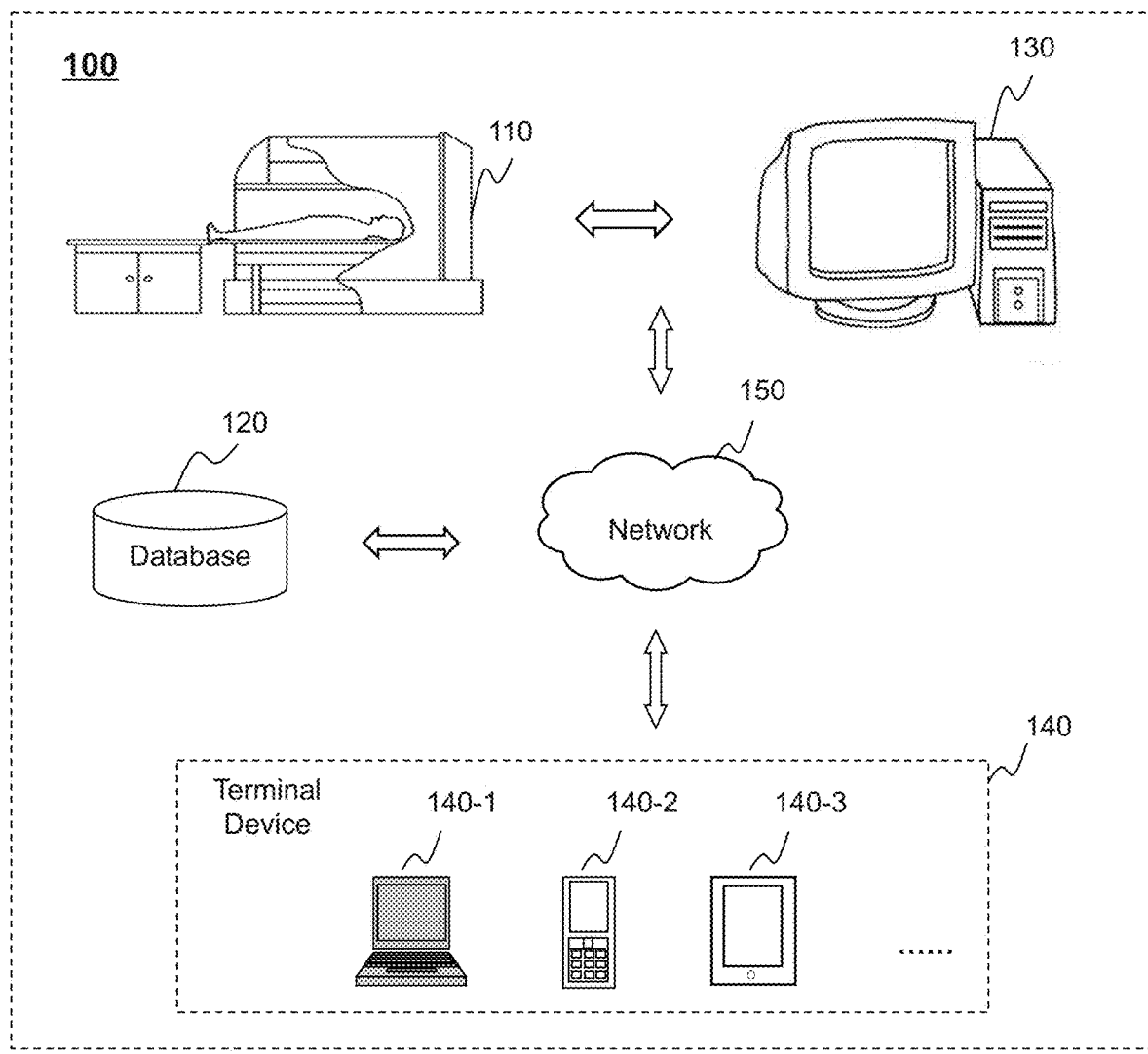
FIG. 1 is a schematic diagram illustrating an exemplary application scenario of a control and processing system according to some embodiments of the present disclosure.

FIG. 1 is a schematic diagram illustrating an exemplary application scenario of a control and processing system according to some embodiments of the present disclosure. As shown in FIG. 1, the control and processing system 100 (also referred to as system 100) may include an imaging device 110, a database 120, and a processing device 130.

The imaging device 110 may generate an image by scanning a target object. The image may be or include a variety of medical images, such as a head image, a chest image, an abdominal image, a pelvic image, a perineal image, a limb image, a spine image, a vertebra image, or the like, or any combination thereof. The head image may include a brain image, a skull image, or the like. The chest image may include an entire chest image, a cardiac image, a breast image, or the like. The abdominal image may include an entire abdominal image, a kidney image, a liver image, or the like. The cardiac image may include, but not be limited to, a omni-directional digitized cardiac image, a digitized cardiac tomography, a cardiac phase-contrast image, an X-ray image, a multimodality image, or the like. The medical image may be a two-dimensional image, a three-dimensional image, or the like. The format of the medical image may include a JPEG format, a TIFF format, a GIF format, an FPX format, or the like. The medical image may be stored in the database 120, or may be transmitted to the processing device 130 for image processing. The cardiac image may be taken as an example in some embodiments of the present disclosure, but those skilled in the art will understand that the system and method disclosed in the present disclosure may also be used for other images.

The database 120 may store image(s) and/or information relating to the image(s). The image(s) and the information relating to the image(s) may be provided by the imaging device 110 and/or the processing device 130, or may be obtained outside the system 100, for example, information inputted by a user, information obtained from a network, or the like. The information relating to the image(s) may include an algorithm, a sample, a model, a parameter for processing the image(s), real-time data during the processing, or the like. The database 120 may be a hierarchical database, a network database, a relational database, or the like. The database 120 may be a local database, or a remote database. The database 120 or other storage devices within the system may digitize the information and then store the digitized information using a storage device that operates in an electrical manner, in an optical manner, or in a magnetical manner. In some embodiments, the database 120 or other storage devices within the system may be a device that stores information using electrical energy, such as a random access memory (RAM), a read-only memory (ROM), or the like. The random access memory may include, but not be limited to, a decimal counter tube, a counting tube, a delay line memory, a Williams tube, a dynamic random access memory (DRAM), a static random access memory (SRAM), a thyristor random access memory (T-RAM), a zero capacitance random access memory (Z-RAM), or the like, or any combination thereof. The read-only memory may include, but not be limited to, a magnetic bubble memory, a magnetic button line memory, a thin-film memory, a magnetic plate line memory, a magnetic core memory, a drum memory, an optical disk drive, a hard disk, a magnetic tape, a non-volatile memory (NVRAM), a phase change memory, a magnetoresistive random storage memory, a ferroelectric random access memory, a non-volatile static random access memory, a programmable read-only memory, a shielded heap read memory, a floating connection gate random access memory, a nano random access memory, a track memory, a variable resistive memory, a programmable metallization unit, or the like, or any combination thereof. In some embodiments, the database 120 or the other storage devices within the system may be a device that stores the information in a magnetic manner, such as a hard disk, a floppy disk, a magnetic tape, a magnetic core memory, a magnetic bubble memory, a USB flash drive, a memory, or the like. In some embodiments, the database 120 or the other storage devices within the system may be a device that stores the information in an optical manner, such as a compact disc (CD), a digital video disc (DVD), or the like. In some embodiments, the database 120 may be a device that stores the information in a magneto-optical manner, such as a magneto-optical disk. The access mode of the database 120 or the other storage devices within the system may include a random access, a serial access, a read-only access, or the like, or any combination thereof. The database 120 or the other storage devices within the system may be a transitory memory or a non-transitory memory. The storage devices mentioned above are some examples for illustration purposes, and are not intended to limit the scope of the present disclosure. The database 120 may be any suitable storage devices.

The database 120 may be a portion of the processing device 130, or may be a portion of the imaging device 110, or may be independent of the processing device 130 and/or the imaging device 110. In some embodiments, the database 120 may be connected to other modules or devices within the system 100 via the network 150. The connection may include a wired connection, a wireless connection, or a combination thereof.

The processing device 130 may obtain the image (or image data) from the imaging device 110, or the database 120. The processing device 130 may process the obtained image. The processing of the image may include grayscale histogram processing, normalization processing, geometric transformation, spatial transformation, image smoothing processing, image enhancement processing, image segmentation processing, image transformation processing, image restoration, image compression, image feature extraction, or the like. The processing device 130 may store the processed image (or image data) using the database 120, or may transmit the processed image data to a device outside the control and processing apparatus system 100.

In some embodiments, the processing device 130 may include one or more processors, storages, or the like. For example, the processing device 130 may include a central processor (CPU), an application-specific integrated circuit (ASIC), a dedicated instruction set processor (ASIP), an image processor (GPU), a physical operation processor (PPU), a digital signal processor (DSP), a field-programmable gate array (FPGA), a programmable logic device (PLD)), a controller, a micro control unit, a processor, a microprocessor, an advanced RISC machine processor, or the like, or any combination thereof.

In some embodiments, the control and processing system 100 may also include a terminal device 140. The terminal device 140 may communicate with the imaging device 110, the database 120, and the processing device 130. For example, the terminal device 140 may obtain the processed image (or image data) from the processing device 130. In some embodiments, the terminal device 140 may obtain the image data from the imaging device 110 and transmit the image data to the processing device 130 for image processing. The terminal device 140 may include one or more input devices, a control panel, or the like. For example, the input device(s) may include a keyboard, a touch screen, a mouse, a voice input device, a scan device, an information recognition device (such as a human eye recognition system, a fingerprint recognition system, a brain monitoring system, etc.), a remote controller, or the like.

The control and processing system 100 may be connected to the network 150. The network 150 may be a wireless network, a mobile network, a wired network, or the like. The wireless network may include a Bluetooth, a wireless local area network (WLAN), Wi-Fi, WiMax, or the like. The mobile network may include a 2G signal, a 3G signal, a 4G signal, or the like. The wired network may include a local area network (LAN), a wide area network (WAN), a proprietary network, etc.

The database 120 and the processing device 130 of the control and processing system 100 may execute operational instructions through a cloud computing platform. The cloud computing platform may include a storage-based cloud platform for data storage, a computing-based cloud platform for data processing, or an integrated cloud computing platform that performs computing processing and data storage. For example, image data generated by the control and processing system 100 may be computed or stored by the cloud computing platform.

It should be noted that the above descriptions of the control and processing system 100 are merely for the convenience of illustration and are not intended to limit the scope of the present disclosure.

Figure 2:
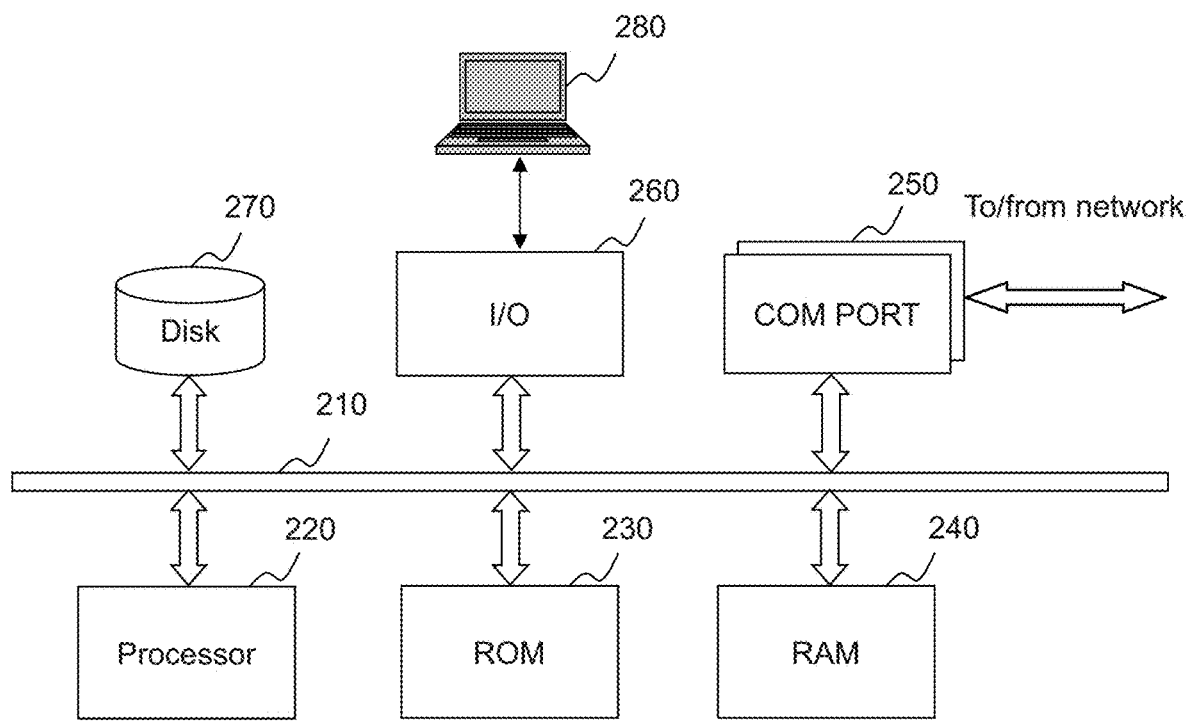
FIG. 2 is a schematic diagram illustrating an exemplary system configuration of a processing device according to some embodiments of the present disclosure.

FIG. 2 is a schematic diagram illustrating an exemplary system configuration of a processing device according to some embodiments of the present disclosure. As shown in FIG. 2, the processing device 130 may include a data bus 210, a processor 220, a read-only storage (ROM) 230, a random storage (RAM) 240, a communication port 250, an input/output port (I/O) 260, a hard disk 270, and a display 280 connected to the I/O 260. The connection manner between the hardware of the processing device 130 may be a wired connection, a wireless connection, or a combination thereof. The hardware may be local, remote, or a combination thereof.

The data bus 210 may be used to transmit data information. In some embodiments, the data transmission between the hardware of the processing device 130 may be implemented via the data bus 210. For example, the processor 220 may send the data, through the data bus 210, to other hardware such as the storage or the I/O 260. It should be noted that the data may be real data, instruction codes, state information, or control information, or the like. In some embodiments, the data bus 210 may be an industry standard (ISA) bus, an extended industry standard (EISA) bus, a video electronic standard (VESA) bus, an external component interconnect standard (PCI) bus, or the like.

The processor 220 may be used for logic computations, data processing, and/or instruction generation. In some embodiments, the processor 220 may obtain data/instructions from an internal memory, which may include a read-only memory (ROM), a random access memory (RAM), a cache (not shown in the figure), or the like. In some embodiments, the processor 220 may include a plurality of sub-processors, which may be used to implement different functions of the system 100.

The read-only memory (ROM) 230 may be used for power-on self-test of the processing device 130, the initialization of each function module of the processing device 130, the driver of the basic input/output of the processing device 130, or the like. In some embodiments, the read-only memory may include a programmable read-only memory (PROM), a programmable erasable read-only memory (EPROM), or the like. The random access memory (RAM) 240 may be used to store an operation system, various applications, data, or the like. In some embodiments, the random access memory (RAM) 240 may include a static random access memory (SRAM), a dynamic random access memory (DRAM), or the like.

The communication port (COM PORT) 250 may be used to connect the operation system with an external network to implement communication between the operation system and the external network. In some embodiments, the communication port 250 may include a file transfer protocol (FTP) port, a hypertext transport protocol (HTTP) port, or a domain name server (DNS) port. The input/output port 260 may be used for the exchanging and controlling of data and/or information between the external device or circuit and the processor 210. In some embodiments, the input/output port 260 may include a universal serial bus (USB) port, a peripheral interface controller (PCI) port, an integrated development environment (IDE) port, etc.

The hard disk 270 may be used to store the information and the data generated by the processing device 130 or received from the processing device 130. In some embodiments, the hard disk 270 may include a mechanical hard disk (HDD), a solid-state hard disk (SSD), or a hybrid hard disk (HHD). The display 280 may be used to display the information and the data generated by the system 130 to a user. In some embodiments, the display 280 may include a physical display, such as a display with a speaker, a liquid crystal display (LCD), alight emitting diode (LED) display, an organic light emitting diode (OLED) display, an electronic ink (E-Ink) display, or the like.

Figure 3:
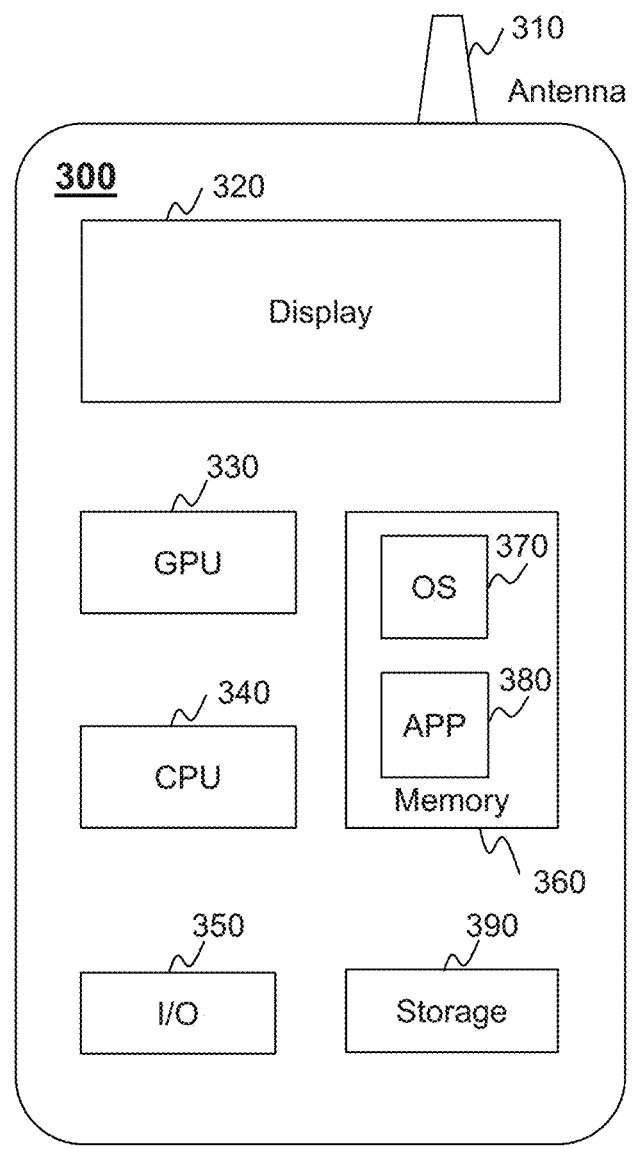
FIG. 3 is a schematic diagram illustrating an exemplary mobile device for implementing some specific systems according to some embodiments of the present disclosure.

FIG. 3 is a schematic diagram illustrating an exemplary mobile device for implementing some specific systems according to some embodiments of the present disclosure. As shown in FIG. 3, the mobile device 300 may include a terminal device 140. In some embodiments, a user may receive or transmit information related to the control and processing system 100 via the mobile device 300. The mobile device 300 may include a smartphone, a personal digital assistant (PDA), a tablet computer, a handheld game player, a smart glasses, a smartwatch, a wearable device, a virtual reality device, or a display enhancement device, or the like, or any combination thereof. In some embodiments, the mobile device 300 may include one or more central processing units (CPUs) 340, one or more graphics processing units (GPUs) 330, a display 320, a memory 360, a communication platform 310, a storage 390, and one or more input/output devices (I/O) 350. In some embodiments, the mobile device 300 may also include a system bus, a controller, or the like. As shown in FIG. 3, the CPU may download the mobile device operation system (e.g., iOS, Android, Windows Phone, etc.) 370 and one or more applications 380 to the memory 360 from the storage 390. The one or more applications 380 may include a web page or other mobile application software (App) for receiving and transmitting information related to the control and processing system 100. The user may obtain or provide the information via the input/output device 350, which may be further transmitted to the control and processing system 100 and/or device units in the system.

In some embodiments of the present disclosure, the computer hardware platform may be used as a hardware platform for one or more elements (e.g., the control and processing system 100 and other parts thereof), implementing various modules, units, and functions thereof. The hardware elements, operation systems, and programming language may be inherently traditional, and those skilled in the art may be likely to adapt these techniques to cardiac image model construction and edge segmentation. A computer with a user interface may be a personal computer (PC), other workstations or terminal devices. A properly programmed computer may also be used as a server. Since those skilled in the art may be familiar with the structure, the programming and the general operation of the computer device used in the present disclosure, no further explanation will be given for other drawings.

Figure 4:
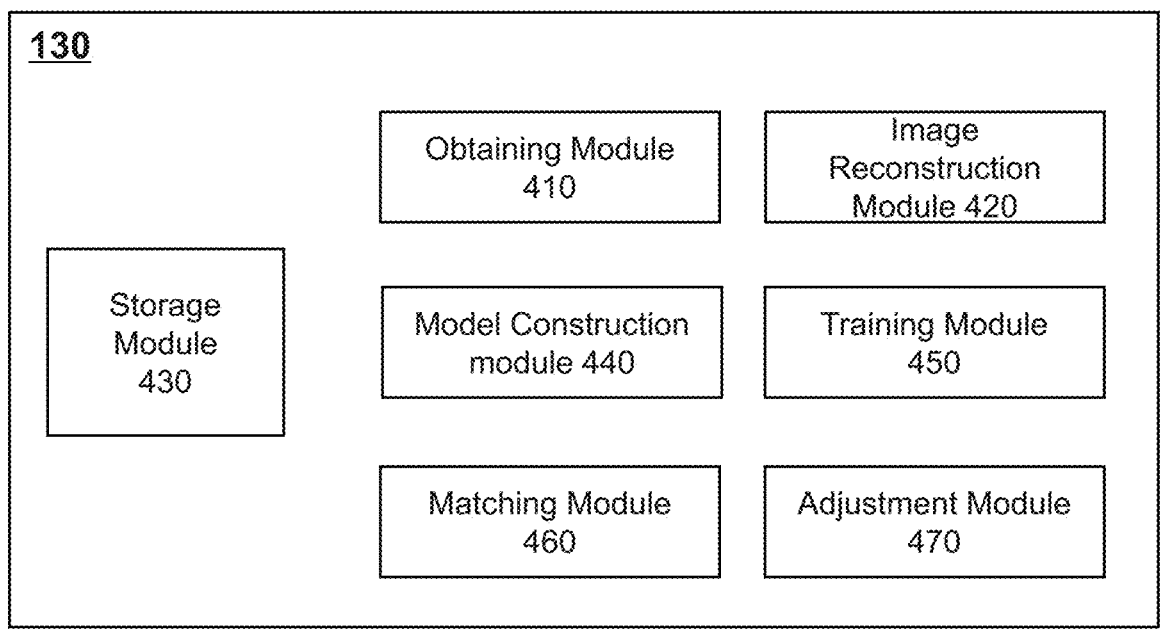
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 130 may include an obtaining module 410, an image reconstruction module 420, a storage module 430, a model construction module 430, a training module 450, a matching module 460, and an adjustment module 470. The connection between modules of the processing device 130 may be a wired connection, a wireless connection, or a combination thereof. Any module may be local, remote, or a combination thereof.

The storage module 430 may be configured to store image data or information, whose functions may be implemented by one or more combination of the hard disk 270, the read-only storage (ROM) 230, the random access storage (RAM) 240 in FIG. 2. The storage module 430 may store information of other modules within the processing device 130, or information of modules or devices outside the processing device 130. The information stored by the storage module 430 may include scan data of the imaging device 110, control commands or parameters inputted by the user, intermediate data or complete data generated by the processing device 130. In some embodiments, the storage module 430 may send the stored information to one or more modules of the processing device 130 (e.g., the image reconstruction model 420, the model construction model 430, etc.) for image processing. In some embodiments, the storage module 430 may store the information generated by the one or more modules of the processing device 130, such as real-time calculation data. The storage module 430 may include, but not be limited to, various types of storage devices such as a solid-state hard disk, a mechanical hard disk, a USB flash memory, an SD memory card, an optical disk, a random storage (RAM), or a read-only storage (ROM), or the like. The storage module 430 may be a storage device of the system, or may be a storage device outside the system or an external storage device, such as a storage on the cloud storage server.

The obtaining module 410 may be configured to obtain the image data collected by the imaging device 110, the image data stored by the database 120, or the data outside the control and processing system 100. The functions of the obtaining module 410 may be implemented by the processor 220 in FIG. 2. The image data may include the image data collected by the imaging device 110, an algorithm, a sample, a model, or a parameter for processing an image, real-time data during the processing, or the like. In some embodiments, the obtaining module 410 may send the obtained image data or information to the image reconstruction module 420 for processing. In some embodiments, the obtaining module 410 may send the obtained algorithm, the parameter, etc. of the processed image to the model construction module 440. In some embodiments, the obtaining module 410 may send the obtained image data or information to the storage module 370 for storage. In some embodiments, the obtaining module 410 may send the obtained sample, the parameter, the model, the real-time data, etc. to the training module 450, the matching module 460, or the adjustment module 470. In some embodiments, the obtaining module 410 may receive a data obtaining instruction from the processor 220 and perform the corresponding data obtaining operation. In some embodiments, the obtaining module 410 may preprocess the image data or information after obtaining the image data or information.

The image reconstruction module 420 may be configured to reconstruct a medical image, whose functions may be implemented by the processor 220 in FIG. 2. In some embodiments, the image reconstruction module 420 may obtain the image data or information from the obtaining module 410 or the storage module 430, and reconstruct the medical image based on the image data or information. The medical image may be a three-dimensional medical image of a human body. The image data may include scan data obtained at different times, different positions, and different angles. According to the scan data, the image reconstruction module 420 may compute feature or state of a portion of the human body, such as an absorption capacity of the corresponding portion of the human body, a density of the tissue of the corresponding portion of the human body, or the like. Then the image reconstruction module 420 may reconstruct the three-dimensional medical image of the human body. In some embodiments, the three-dimensional medical image of the human body may be displayed via the display 280 or stored by the storage module 430. In some embodiments, the three-dimensional medical image of the human body may be transmitted to the model construction module 440 for further processing.

The model construction module 440 may be configured to construct a three-dimensional average model of a target object. In some embodiments, the target object may be a heart. The three-dimensional average model may be a three-dimensional average grid model of a heart chamber constructed based on a plurality of sets of reference models. In some embodiments, the model construction module 440 may obtain the reference model(s) of at least one heart chamber and information related to the reference model(s) from the obtaining module 410, the storage module 430, or the user input. The information related to the reference model(s) may include a size of an image, pixels of the image, a spatial position of the pixel(s), or the like. In some embodiments, the model construction module 440 may perform registration (or pre-processing) on the reference model(s) based on the obtained reference model(s) of the at least one heart chamber and the information related to the reference model(s), so that the directions and ratios of all the reference models are consistent. The edge of the chamber of the pre-processed image may be labelled manually or automatically labelled by the processor. Then the reference model (e.g., heart reference model) may be divided into a plurality of sub-heart chambers, and a heart chamber average grid model may be constructed based on the edge point data of each chamber. The model construction module 440 may send the heart chamber average grid model to the storage module 430 for storage, or to the training module 450 or the matching module 460 for further processing. In some embodiments, the model construction module 440 may also determine the relationship between one or more chambers in the average model (e.g., the heart chamber average grid model) based on the plurality of sets of the reference models. For example, the model construction module 440 may construct a correlation factor matrix that represents the effect of each chamber on one or more edge data points. By constructing the correlation factor matrix, the chamber boundary separation may be improved. The model construction module 440 may send the constructed correlation factor matrix to the storage module 430 for storage, or to the matching module 460 or the adjustment module 470 for further processing.

The training module 450 may be configured to train a classifier. The training module 450 may divide possible edge points into different chamber categories. For example, the training module 450 may divide a range of data points near the edge of the reference model into six-chamber categories, such as the left ventricle, the left atrium, the right ventricle, the right atrium, the left myocardium, or the aorta, respectively. As another example, the training module 450 may divide, based on the change degree of the edge of the chamber, a range of data points near the edge of the reference model into ten chamber categories, such as the left ventricular edge, the left atrium sharp edge, the left atrium non-sharp edge, the right ventricular sharp edge, the right ventricle non-sharp edge, the right atrium sharp edge, the right atrium non-sharp edge, the aortic edge, the left myocardium sharp edge, and the left myocardial non-sharp edge, respectively. In some embodiments, the training module 450 may obtain the reference model(s) of the at least one heart chamber and information related to the reference model(s) from the storage module 430, the model construction module 440, or the user input. The information related to the reference model may include the edge point data of each chamber in the reference model, or the like. In some embodiments, the training module 450 may divide the points near the edge of the chamber into positive samples and negative samples according to the distance between the points and the edge of the chamber. In some embodiments, the positive samples may include data points within a certain threshold range of the edge of the chamber, and the negative samples may include data points that are distant from the edge of the chamber and located at other random positions in the space. In some embodiments, the training module 450 may train the points near the edge of the chamber on the reference model or the average model based on the positive sample points or the negative sample points to obtain one or more classifiers. For example, the training module 450 may obtain a point classifier. The point classifier may classify the plurality of points of the first edge according to an image feature. The image feature may be related to sharpness and location. As another example, the training module 450 may obtain a first classifier. The first classifier may be related to the point classifier. In some embodiments, the first classifier may determine a plurality of classified points within a certain range of the first edge as positive samples and determine a plurality of classified points outside the certain range of the first edge as negative samples based on the plurality of points classified by the point classifier. Then, the positive samples and the negative samples may be classified. The trained first classifier may be obtained based on the classified positive samples and the classified negative samples. In some embodiments, the training module 450 may train the classifier using Probabilistic Boosting-Tree (PBT). The PBT may include a two-level PBT algorithm or a multi-level PBT algorithm. The training module 450 may send the trained classifier to the storage module 430 for storage, or to the adjustment module 470 for further processing.

The matching module 460 may be configured to match the image (e.g., the medical image) with the average model constructed by the model construction module 440 to construct a three-dimensional grid model corresponding to the image. The image may be obtained from the image reconstruction module 420 or the storage module 430. In some embodiments, the matching module 460 may match the average model to the image using, e.g., a Hough transform, to obtain a three-dimensional grid model of the heart chamber roughly matching the image. The matching module 460 may obtain the information (such as parameters) required by the Hough transform from the obtaining module 410, the storage module 430, or the user input. The matching module 460 may send the matched three-dimensional grid model of the heart chamber to the storage module 430 for storage, or to the adjustment module 470 for further optimization.

Figure 26:
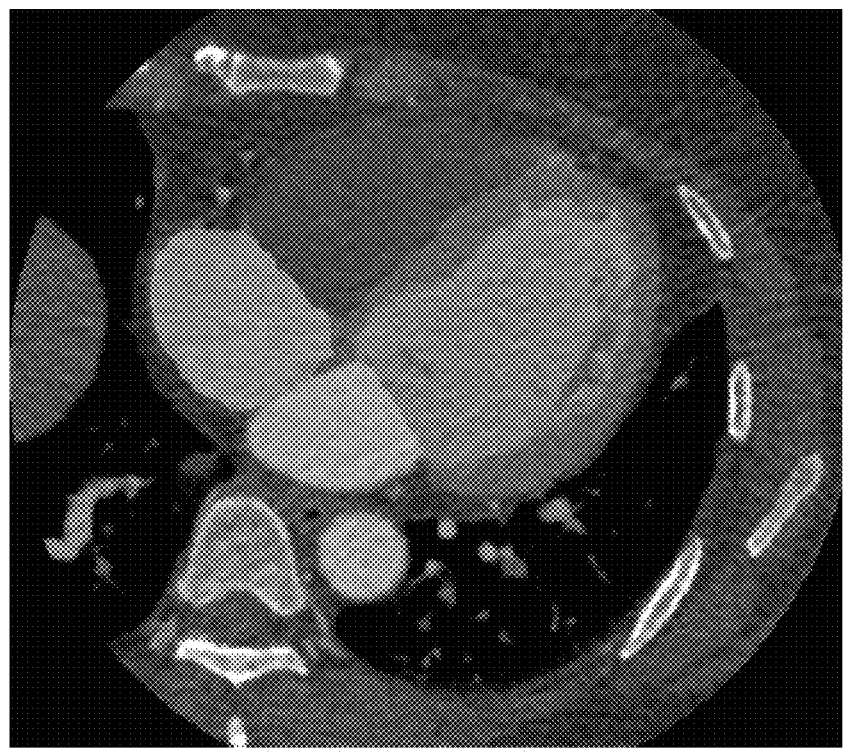
FIG. 26 is a diagram illustrating an exemplary segmentation result of an adjusted precisely matched image chamber according to some embodiments of the present disclosure.
Figure 27A:
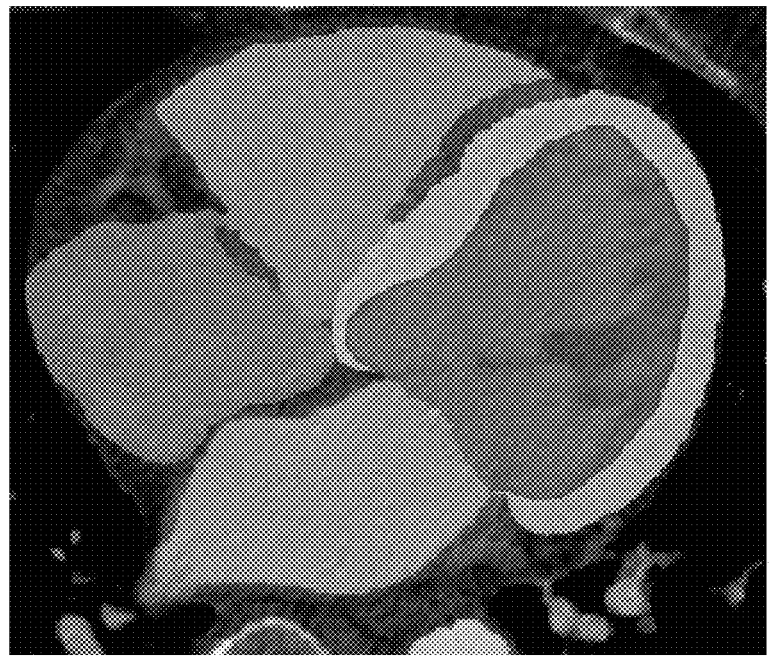
FIG. 27A shows an image segmentation image divided not based on a correlation factor according to some embodiments of the present disclosure.
Figure 27B:
FIG. 27B shows an image segmentation image divided based on a correlation factor according to some embodiments of the present disclosure.

The adjustment module 470 may be configured to optimize the model such that the model is closer to the real heart (e.g., cardiac image data). The adjustment module 470 may obtain the matched grid model of the heart chamber from the matching module 460 or the storage module 430. In some embodiments, the adjustment module 470 may determine the optimal heart chamber edge based on a probability that the data points within the certain range of the edge of the chamber on the matched heart model (e.g., the matched grid model) belong to the edge of the chamber. The adjustment module 470 may further precisely adjust the three-dimensional grid model of the heart chamber. The precise adjustment may include a similarity transformation, a segmentation affine transformation, a micro-variation based on an energy function, or the like. In some embodiments, the adjustment module 470 may perform an image form conversion on the precisely adjusted three-dimensional grid model of the heart chamber to obtain an edge segmentation image of the heart chamber (as shown in FIG. 26). The adjustment module 470 may send the precisely adjusted three-dimensional grid model of the heart chamber or the edge segmentation image of the heart chamber to the storage module 430 for storage, or to the display 280 for display.

It should be noted that the above descriptions of the processing device 130 are merely for convenience of illustration and are not intended to limit the scope of the present disclosure. It should be understood that, for those skilled in the art, after understanding the working principle of the device, it is possible to arbitrarily combine the various modules, or to connect a subsystem to other modules, or make various modifications and changes to the forms and details of the device without departing from the principle. For example, the model construction module 440 and/or the training module 450 may be omitted or combined with the storage module 430. All such variations are within the protection scope of the present disclosure.

Figure 5:
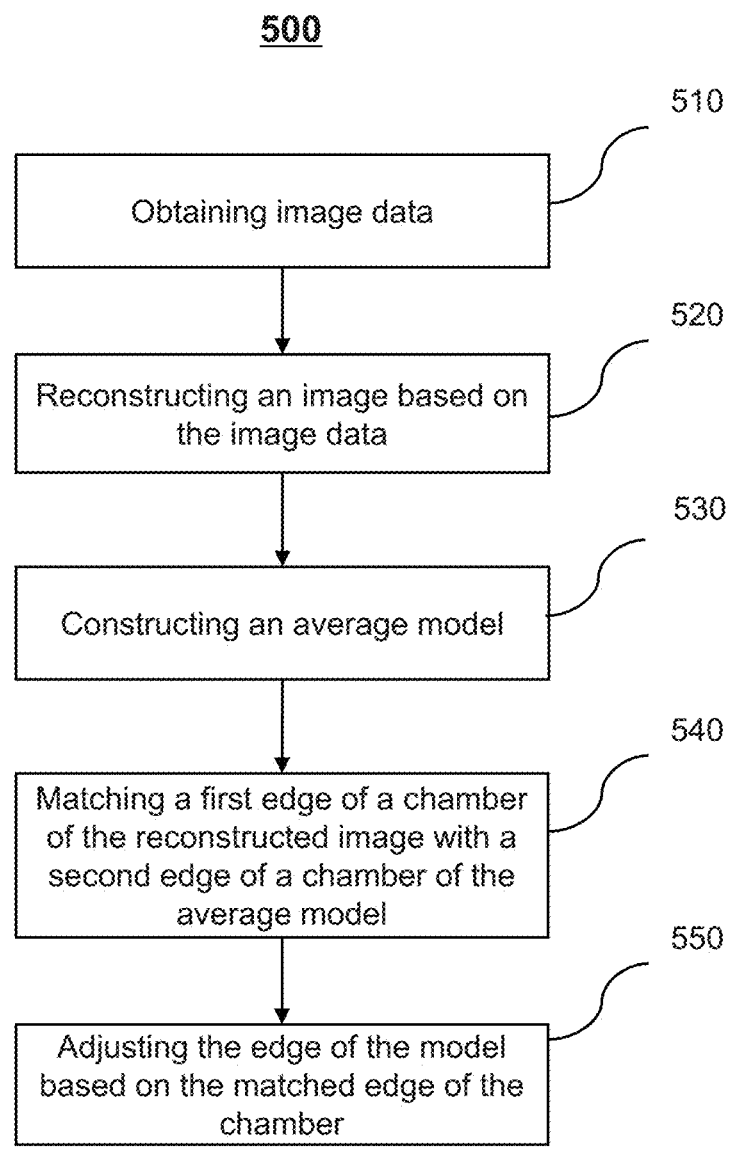
FIG. 5 is a flowchart illustrating an exemplary process for implementing the processing device according to some embodiments of the present disclosure.

FIG. 5 is a flowchart illustrating an exemplary process for implementing a processing device according to some embodiments of the present disclosure. In 510, image data may be obtained. In some embodiments, the operation 510 may be implemented by the obtaining module 410. The image data may be obtained from the imaging device 110, the database 120, or a device external to the control and processing system 100. The image data may include original image data obtained by a computed tomography (CT) device, a positron emission tomography (PET) device, a single-photon emission tomography (SPECT) device, a magnetic resonance imaging (MRI) device, an ultrasound device, and other medical image devices. In some embodiments, the image data may be original image data of the heart or a portion of the heart. In some embodiments, the operation 510 may include pre-processing the obtained original image data (e.g., cardiac original image data), and transmitting the pre-processed original image data to the image reconstruction module 420 or the storage module 430 of the processing device 130. The pre-processing of an image may include distortion corrections, denoising, smoothing, enhancements, etc. of the image.

In 520, a cardiac image may be reconstructed based on the cardiac image data. The operation 502 may be implemented by the image reconstruction module 420 of the processing device 130 based on image reconstruction techniques. The cardiac image data may be obtained from the obtaining module 410 or the storage module 430. The cardiac image may include a omni-directional digitized cardiac image, a digitized cardiac tomography, a cardiac phase-contrast image, an X-ray image, a multimodality image, or the like. The cardiac image may be a two-dimensional image or a three-dimensional image. The format of the cardiac image may include a JPEG format, a TIFF format, a GIF format, an FPX format, or the like. The image reconstruction technique may include a solving simultaneous equation technique, a Fourier transform reconstruction technique, a direct back projection reconstruction technique, a filter back projection reconstruction technique, a Fourier back projection reconstruction technique, a convolution back projection reconstruction technique, an iterative reconstruction technique, or the like. In some embodiments, operation 520 may include pre-processing the obtained cardiac image data and obtaining a plurality of heart sections or projection. In some embodiments, the obtained cardiac image data or the pre-processed cardiac image data may include a plurality of heart sections. The image reconstruction module 420 may reconstruct the cardiac image or model based on the information provided by the plurality of the heart sections. The information provided by the heart sections may include tissue densities of different parts of the heart, absorption abilities to radiation, or the like. The reconstructed cardiac image may be displayed by the display 280 or be stored by the storage module 430. The reconstructed cardiac image may be further processed by the model construction module 440 of the processing device 130.

In 530, a three-dimensional cardiac average grid model may be constructed. The operation 530 may be implemented by the model construction module 440 of the processing device 130 based on a plurality of reference models. The operation 530 may include obtaining the plurality of reference models from the obtaining module 410, the storage module 430, or the user input. In some embodiments, the operation 530 may include image registrations on the plurality of reference models. The image registration may include a grayscale-based image registration, a domain transformation-based image registration, a feature-based image registration, or the like. The feature may include a feature point, a feature region, a feature edge, or the like. In some embodiments, the plurality of reference models may be heart chamber segmentation data or the reference models in which the edge of the chamber may be labelled by the user. The average model may include a Point Distribution Model (PDM), an Active Shape Model (ASM), an Active Contour Model (also known as Snakes), an Active Appearance Model (AAM), or other computational model, or the like. In some embodiments, the operation 530 may include determining a relationship between the respective chambers on the constructed average model based on the chamber edge data on the plurality of reference models, and establishing a two-dimensional correlation factor matrix. In some embodiments, the processor 220 may send the three-dimensional cardiac average grid model or the average model containing the correlation factor information to the storage module 430 of the processing device 130 for storage, or to the matching module 460 for further processing.

Figure 24:
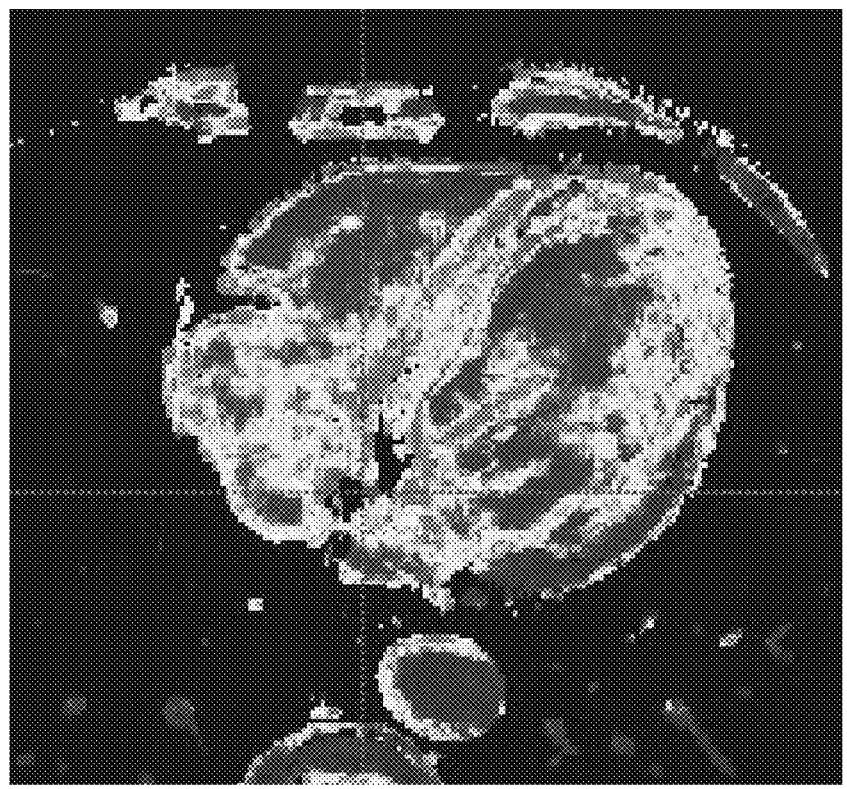
FIG. 24 is an embodiment illustrating an image probability map obtained based on a classifier according to some embodiments of the present disclosure.

In 540, the cardiac image data may be matched with the three-dimensional cardiac average grid model. In some embodiments, the matching may include matching a first edge of the cardiac image data with a second edge of the three-dimensional heart average grid model. In some embodiments, the first edge may include an outer edge and an inner edge. The outer edge may be the outer contour of the heart. The inner edge may be the inner chamber contour of the heart. The outer contour and the inner chamber contour may be filled by heart tissues. In some embodiments, corresponding to the first edge, the second edge of the three-dimensional cardiac average grid model may include an outer edge and an inner edge. The outer edge of the second edge may correspond to the edge of the outer contour of the heart, and the inner edge of the second edge may correspond to the edge of the contour of the inner chamber of the heart. The outer and inner edges may refer to edges for a rough matching and a precise matching, respectively. If the process disclosed in the present disclosure is used for other objects, organs or tissues, the outer and inner edges may not necessarily have a geometrical internal and external relationship. For example, for certain objects, organs, or tissues, the edge for the rough matching may be on the outside, inside, or the same side of the edge used for the precise matching. As another example, the edge for the rough matching may overlap or intersect with the edge for the precise matching. In some embodiments, the matching between the cardiac image data and the three-dimensional cardiac average model may be a matching between the outer edge of the first edge of the cardiac image data and the outer edge of the second edge of the three-dimensional cardiac average model. In some embodiments, the operation 540 may be implemented by the matching module 460 based on an image matching algorithm. The image matching algorithm may include a matching algorithm based on NNDR, a search algorithm of adjacent feature points, an object detection based on Hough transform, or the like. In some embodiments, the heart average model constructed by the model construction module 440 may be matched to the first edge on the cardiac image data obtained by the image reconstruction module 420 based on a Generalized Hough Transform, and a matched heart model may be obtained. In some embodiments, the first edge may include a plurality of points. The plurality of points of the first edge may be classified based on the image feature to obtain a point classifier. The image feature may be related to sharpness and location. In some embodiments, a weighted Generalized Hough Transform may be implemented based on the probability that the points on the cardiac image data to be matched are part of the edge. The probability may be computed by inputting each point on the cardiac image data to be matched into the first classifier trained by the training module 450. The first classifier may be obtained based on a point classifier. The point classifier may be determined by classifying the plurality of points of the first edge according to the image feature. In some embodiments, an edge probability map of the heart to be matched may be constructed based on the probability of the points on the heart to be matched. The edge probability map may include a grayscale gradient map, a color gradient map (as shown in FIG. 24), or the like. In some embodiments, the cardiac image may be pre-processed before computing the probability that each point on the cardiac image data to be matched is at an edge. For example, a portion of the heart that is completely impossible to be the edge of the heart may be excluded, thereby reducing the computation amount of the classifier. For example, for a CT image, the CT value of the muscular tissue may be generally greater than −50, and the portion whose CT value is less than −50 may be labelled by a mask so that the classifier may not need to compute the points within the portion labelled by the mask. In some embodiments, the matching module 460 of the processing device 130 may send the matched heart model or the three-dimensional heart grid model to the storage module 430 for storage, or to the adjustment module 470 for further optimization.

In 550, a precisely adjusted heart chamber segmentation image may be obtained. The operation 550 may be implemented by the adjustment module 470 of the processing device 130. In some embodiments, the adjustment module 470 may adjust the edge points of the chamber (e.g., the inner edge of the second edge) on the model to achieve the matching with the inner edge of the first edge in the cardiac image data. In some embodiments, the operation 550 may include determining an edge object point based on a chamber edge on the matched three-dimensional heart grid model. In some embodiments, the edge object point may be determined according to the probability of a second edge point within a certain range of the chamber edge on the matched three-dimensional heart grid model. In some embodiments, the probability may be computed based on a second classifier trained by the second edge points. In some embodiments, the probability may be computed based on the first classifier trained by the plurality of reference models or the average model. In some embodiments, the operation 550 may include performing a deformation on the three-dimensional cardiac grid model based on the determined edge object points, thereby obtaining an adjusted three-dimensional cardiac grid model whose chamber edge is adjusted. The transformation may include a similarity transformation, an affine transformation, other image micro-deformation techniques, or the like. For example, in some embodiments, the similarity transformation, the segmentation affine transformation, and/or the energy function-based micro-variation may be performed based on the determined edge object points. In some embodiments, the adjustment module 470 of the processing device 130 may convert the adjusted three-dimensional heart grid model into a heart chamber segmentation image (as shown in FIG. 26) by a mask. The different chambers of the chamber segmentation image may be labelled with different colors. In some embodiments, the adjustment module 470 of the processing device 130 may send the precisely adjusted heart chamber model or the heart chamber segmentation image to the storage module 430 for storage, or to the display 280 for display.

It should be noted that the above descriptions of the chamber segmentation process by the processing device 130 are merely for convenience of illustration and are not intended to limit the scope of the present disclosure. It should be understood that, for those skilled in the art, after understanding the working principle of the device, it is possible to arbitrarily adjust the order of the operations, or add or remove some operation without departing from the principle. For example, the operation 530 of constructing the average model may be removed. As another example, the adjustment module 470 may perform one or more of the adjustments on the grid model, or adopt other forms of micro-variation. All such variations are within the protection scope of the present disclosure.

Figure 6:
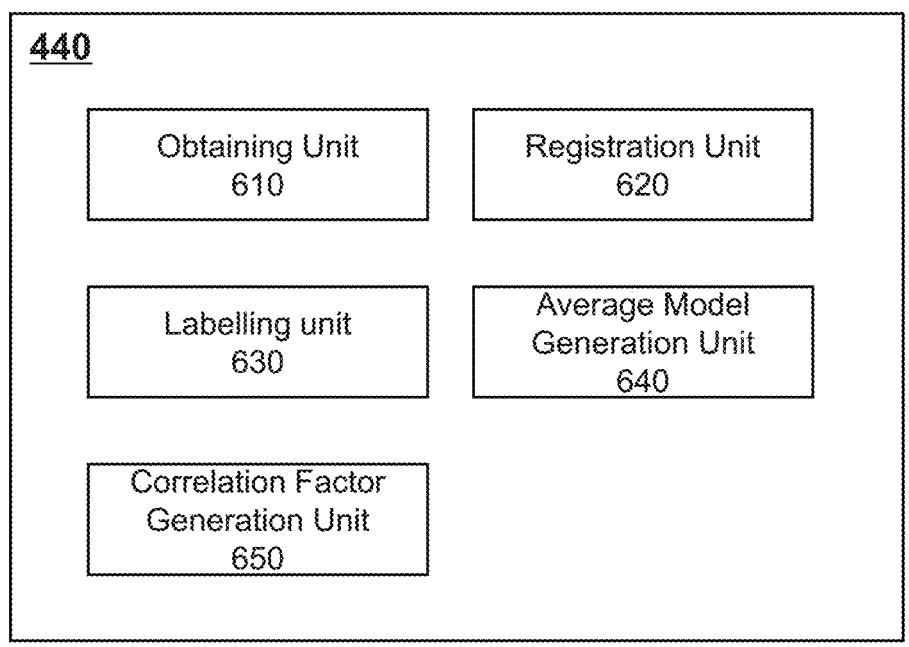
FIG. 6 is a schematic diagram illustrating an exemplary model construction module according to some embodiments of the present disclosure.

FIG. 6 is a schematic diagram illustrating an exemplary model construction module according to some embodiments of the present disclosure. The model construction module 440 may include an obtaining unit 610, a registration unit 620, a labelling unit 630, an average model generation unit 640, and a correlation factor generation unit 650. The connection between modules of the model construction module 440 may be a wired connection, a wireless connection, or a combination thereof. Any module may be local, remote, or a combination thereof.

The obtaining unit 610 may be configured to obtain a plurality of reference models. The obtaining unit 610 may obtain the information from the database 120, storage devices external to the controlling and processing system 100, or the user input. The functions of the obtaining unit 610 may be implemented by the processor 220 in FIG. 2. In some embodiments, the plurality of reference models may include cardiac image data of a patient scanned at different times, different locations, and different angles. In some embodiments, the plurality of sets of cardiac data may include cardiac image data of different patients scanned at different positions and different angles. In some embodiments, the obtaining unit 610 may also be configured to obtain a modeling algorithm, a parameter, or the like. The obtaining unit 610 may send the obtained plurality of reference models and/or other information to the registration unit 620, the labelling unit 630, the average model generation unit 640, or the correlation factor generation unit 650.

The registration unit 620 may be configured to adjust the plurality of reference models obtained by the obtaining unit 610 based on an image registration algorithm, and make the positions, ratios, etc. of the plurality of reference models consistent. The image registration may include a spatial dimensional-based registration, a feature-based registration, a transformation-based registration, an optimization algorithm-based registration, an image modality-based registration, a body-based registration, or the like. In some embodiments, the registration unit 620 may register the plurality of reference models into the same coordinate system. The registration unit 620 may send the registered plurality of reference models to the storage module 430 for storage, or to the labelling unit 630 and/or the average model generation unit 640 for further processing.

Figure 17:
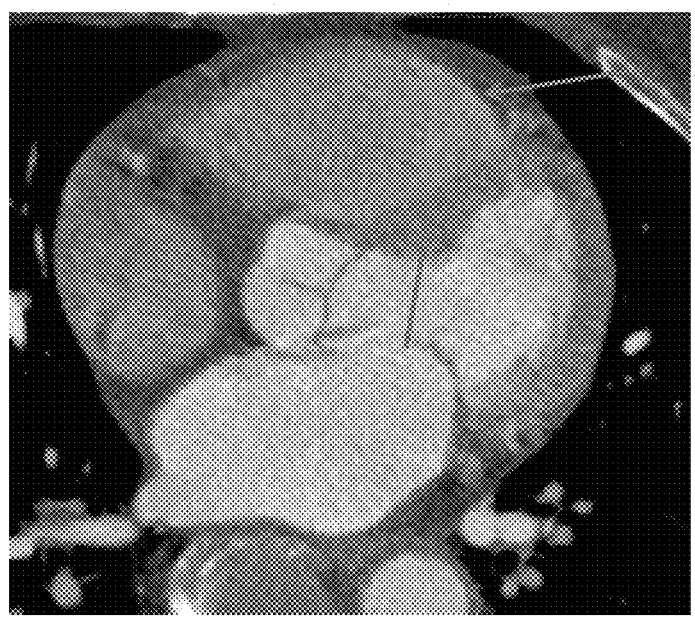
FIG. 17 is a schematic diagram illustrating an image sharpness according to some embodiments of the present disclosure.
Figure 18:
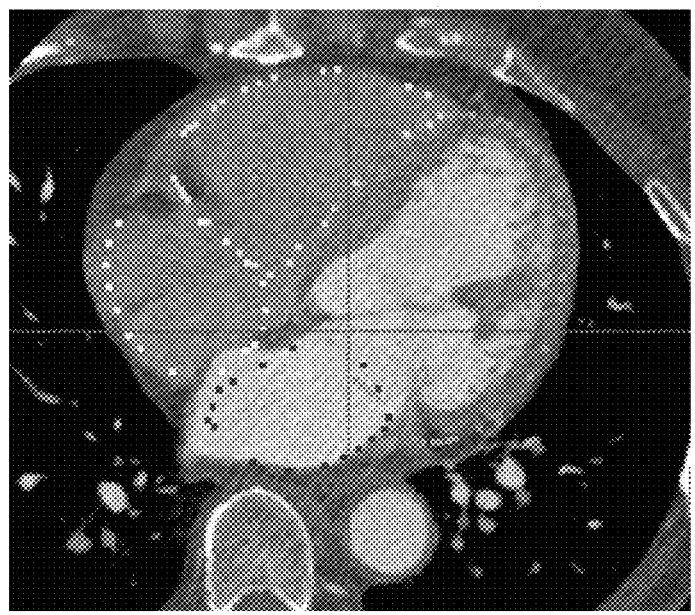
FIG. 18 is an embodiment illustrating an image edge classification training according to some embodiments of the present disclosure.

The labelling unit 630 may be configured to label a plurality of data points (also referred to as point sets) at the edge of the chamber of the plurality of reference model. The cardiac image or model may be the plurality of reference models after the image registration by the registration unit 620, or may be an average model constructed by the average model generation unit 640. For example, the chamber edge may be manually labelled by the user on the plurality of reference models after the image registration by the registration unit 620. As another example, the chamber edge may be automatically labelled by the labelling unit 630 according to a distinct chamber edge feature. In some embodiments, the labelling unit 630 may divide the entire cardiac image or model on the plurality of reference models into six parts, such as the left ventricle, the left atrium, the right ventricle, the right atrium, the myocardium, and the aorta. In some embodiments, the labelling unit 630 may divide the entire cardiac image or model on the plurality of reference models into sharp and non-sharp categories according to the change degree (also referred to as gradient) of the edge of the chamber on the plurality of reference models. Specifically, the labelling unit 630 may label the edge points of the chambers that are connected to the outside or that have small change degree relative to the outside as the sharp category, and label the edge points that are connected to other inside chambers or that have large change degree relative to the outside as the non-sharp category, as indicated by two arrows in FIG. 17. For example, the labelling unit 630 may divide the entire cardiac image or model on the plurality of reference models into 10 categories, such as the left ventricular margin, the left atrial sharp edge, the left atrial non-sharp edge, the right ventricular sharp edge, the right ventricular non-sharp edge, the right atrial sharp margin, the right atrial non-sharp edge, the aortic margin, the left myocardium sharp edge, and the left myocardial non-sharp edge (as shown in FIG. 18). In some embodiments, the labelling unit 630 may register the plurality of reference models into a same coordinate system. and the labelling unit 630 may label the chamber edges on the plurality of reference models by comparing the plurality of reference models with the positions of the points on the average model obtained by the average model generation unit 640. For example, the labelling unit 630 may determine the category of the point on the average model that is closest to the corresponding point on the reference model as the category of the point on the reference model. The labelling unit 630 may send the plurality of reference models with a set of chamber edge points to the storage module 430 for storage, or to the training module 450, the average model generation unit 640, and/or the correlation factor generation unit 650 for further processing or computing.

Figure 20:
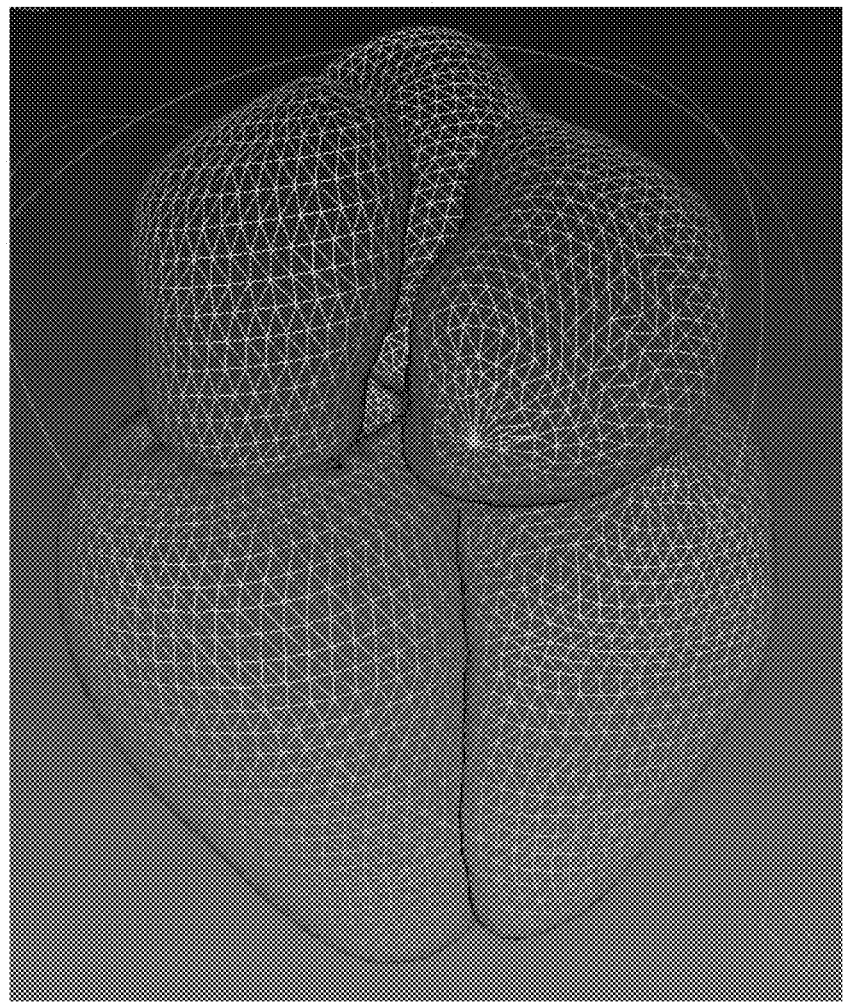
FIG. 20 is an embodiment illustrating a model grid partitioning according to some embodiments of the present disclosure.

The average model generation unit 640 may be configured to construct a three-dimensional cardiac average grid model. In some embodiments, the average model generation unit 640 may extract the chamber edges of the labelled plurality of reference models or the labelled average model. The average model generation unit 640 may also obtain a plurality of reference grid models by processing the chamber edge models in each reference model or the average model. The average model generation unit 640 may then obtain the average grid model based on an image model construction algorithm. The image model construction algorithm may include a Point Distribution Model (PDM), an Active Shape Model (ASM), an Active Contour Model (also called Snakes), an Active Appearance Model (AAM), or the like. In some embodiments, the average model generation unit 640 may divide the labelled cardiac average model into six independent or combined sub-models, for example, the left ventricle model, the left atrial model, the right ventricle model, the right atrial model, the left myocardial model, and the aortic model (as shown in FIG. 20). In some embodiments, the average model generation unit 640 may extract the plurality of chamber edges, determine the distribution of control points on the plurality of chamber edges, and form a network by connecting the control points. In some embodiments, the average model generation unit 640 may obtain the average grid model of the heart chamber and the corresponding model values such as feature values and feature vectors using an ASM modeling algorithm based on the grid model.

In some embodiments, the average model generation unit 640 may consider the influence of the correlation factor on the control point during the average model computation. For example, in the ASM computation, the average model generation unit 640 may use a weighted average (i.e., $\Sigma(F_i * W_i)$) to compute the adjustment result of the control point. $F_i$ is the deformation parameter of a chamber, and Wi is the influence coefficient or the weight of the chamber to the control point. The weighted average calculation based on the correlation factor may cause the adjustment of the control point on the model to be affected by the result of the chamber, thereby achieving the purpose of correlating the plurality of chambers. The average model generation unit 640 may send the three-dimensional cardiac average grid model to the storage module 430 for storage or to the correlation factor generation unit 650 for computation. The average model generation unit 640 may further send the three-dimensional cardiac average grid model to the training module 450 and/or the matching module 460 for further processing.

The correlation factor generation unit 650 may be configured to establish a relationship between each chamber and the control points on the average grid model. In some embodiments, the relationship may be a two-dimensional correlation factor matrix (also referred to as matrix) of the chamber and the control point. The value of the matrix may represent the influence coefficient or weight of each chamber on each control point. In some embodiments, the value of the matrix may be any real number between 0-1. For example, the exemplary two-dimensional correlation factor matrix may be shown as:

|  | Left ventricle | Left atrium | Right ventricle | Right atrium | Myocardium | Aorta |
| --- | --- | --- | --- | --- | --- | --- |
| control point 1 | 1 | 0 | 0 | 0 | 0 | 0 |
| control point 2 | 0.8 | 0.2 | 0 | 0 | 0 | 0 |

In some embodiments, the control point 1 may belong to the left ventricle and may not be in the junction of the left ventricle and atrium. Therefore, the influence coefficient of control point 1 with respect to the left ventricle is 1 and other chambers is 0. The control point 2 may belong to the left ventricle and may be located at the junction of the left ventricle and the left atrium. Therefore, the influence coefficient of point 2 with respect to the left ventricle is 0.8 and the left atrium is 0.2.

Figure 21:
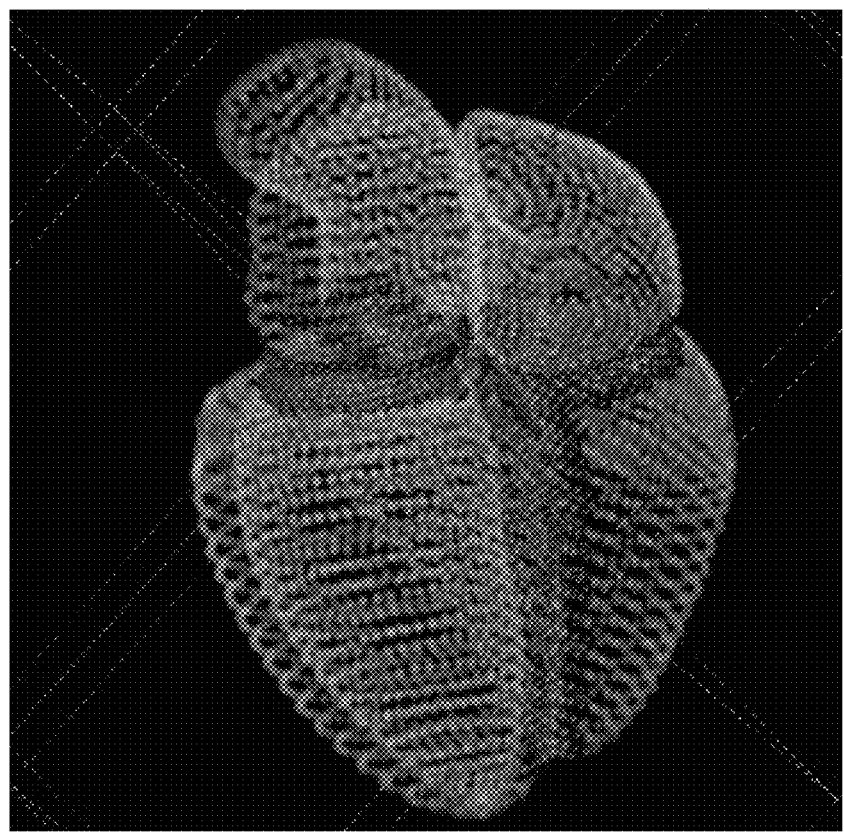
FIG. 21 is an embodiment illustrating a correlation factor-based grid model according to some embodiments of the present disclosure.

In some embodiments, the correlation factor generation unit 650 may establish a correlation factor matrix according to the chamber attribution of the control points on the grid model and the positional relationships between the control points and other chambers. In some embodiments, the correlation factor generation unit 650 may compute an influence range or influence coefficient of the correlation factor according to the distance between the control point and other chambers. For example, the correlation factor generation unit 650 may control the computation of the correlation factor by the maximum distance of the control point distance from other chambers. In some embodiments, the correlation factor generation unit 650 may adjust the influence range and the influence coefficient between different chambers according to the compactness degree between the chambers. As shown in FIG. 21, in the grid control point model, a control point with a light color may indicate that the control point is only affected by the chamber, and the dark chamber junction may indicate that the control points therein are affected by the plurality of connected chambers. The darker the color, the greater the influence by other chambers. The correlation factor generation unit 650 may send the obtained two-dimensional correlation factor matrix to the storage module 430 for storage, or to the average model generation unit 640 and/or the adjustment module 470 for weighting computation.

It should be noted that the above descriptions of the model construction module 440 are merely for convenience of illustration and are not intended to limit the scope of the present disclosure. It will be understood that those skilled in the art, after understanding the working principle of the module, it is possible to make any combination of the units in the module, or to form a subsystem connected with other units, and make various modifications and changes to the form and details of the module without departing from the principle. For example, the registration unit 620 and/or the labelling unit 630 may be omitted, or may be combined with the obtaining unit 610 and the storage module 430. As another example, the plurality of reference models or the average model may include cardiac data or models that have been edge-labelled by the user. As a further example, the plurality of reference models or the average model may include cardiac data with rough segmented chambers or precise segmented chambers. All such variations are within the protection scope of the present disclosure.

Figure 7:
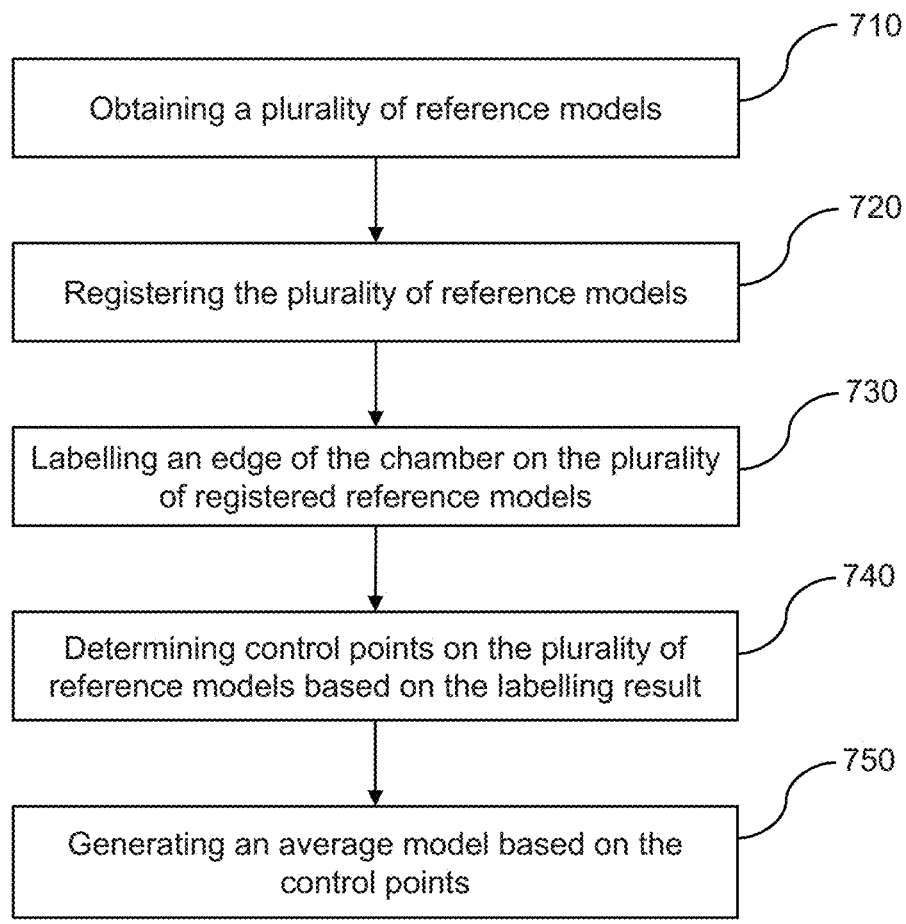
FIG. 7 is a flowchart illustrating an exemplary process for constructing an average model according to some embodiments of the present disclosure.

FIG. 7 is a flowchart illustrating an exemplary process for constructing an average model according to some embodiments of the present disclosure. In 710, a plurality of cardiac reference models may be obtained. The plurality of cardiac reference models may be obtained from the database 120, the user input, or storage devices outside the control and processing system 100. In some embodiments, the plurality of cardiac reference models may include cardiac image data of a patient scanned at different times, different locations, and different angles. In some embodiments, the plurality of cardiac reference models may include cardiac image data of different patients scanned at different positions and different angles. In some embodiments, the plurality of cardiac reference models may include cardiac data or models that have been edge-labelled by experts. In some embodiments, the plurality of reference models may include cardiac data with rough segmented chambers or precise segmented chambers.

In 720, an image registration may be performed on the obtained plurality of reference models. The operation 720 may be implemented by the registration unit 620 of the model construction module 440. In some embodiments, any two reference models may be transformed into the same coordinate system using one or more operations (such as translation, rotation, scaling, etc.), making the points corresponding to the same position in space in the two reference models being one-to-one correspondence, thereby implementing the information fuse. In some embodiments, the image registration may include a spatial dimensional-based registration, a feature-based registration, a transformation-based registration, an optimization algorithm-based registration, an image modality-based registration, a body-based registration, or the like. The spatial dimension-based registration may include a 2D/2D registration, a 2D/3D registration, a 3D/3D registration, or the like. The feature-based registration may include a registration based on feature points (e.g., discontinuity points, shape turning points, line intersections, etc.), a registration based on face regions (e.g., curves, surfaces, etc.), a pixel-based registration, an external feature-based registration, or the like. The transformation-based registration may include a stiffness transformation-based registration, an affine transformation-based registration, a projection transformation-based registration, a curve transformation-based registration, or the like. The optimization algorithm-based registration may include a registration based on gradient descent algorithm, a registration based on a Newton algorithm, a registration based on a Powell algorithm, a registration based on a genetic algorithm, or the like. The image modality-based registration may include a single modality-based registration and/or a multimodality-based registration. The body-based registration may include a registration based on images from a same patient, a registration based on images from different patients, and/or a registration based on patient data and atlas.

In 730, an edge of the chamber may be labelled on the plurality of registered reference models. The operation 730 may be implemented by the labelling unit 630 of the model construction module 440. In some embodiments, the edge points may be manually labelled by the user on the plurality of heart reference models. The edge points on each reference model may divide the heart into six parts: the left ventricle, the left atrium, the right ventricle, the right atrium, the myocardium, and the aorta, respectively. In some embodiments, the heart may be divided into 10 categories according to the change degree of the edge of the chamber relative to the outside and inside, that is, the left ventricular margin, the left atrial sharp edge, the left atrial non-sharp edge, the right ventricular sharp edge, the right ventricular non-sharp edge, the right atrial sharp margin, the right atrial non-sharp edge, the aortic margin, the left myocardium sharp edge, and the left myocardial non-sharp edge (as shown in FIG. 18). The sharp edge may refer to that the edge of the chamber is connected to the outside or does not have significant changes. The non-sharp may refer to that the edge of the chamber is connected to the inside or other chambers or has significant changes.

Figure 19:
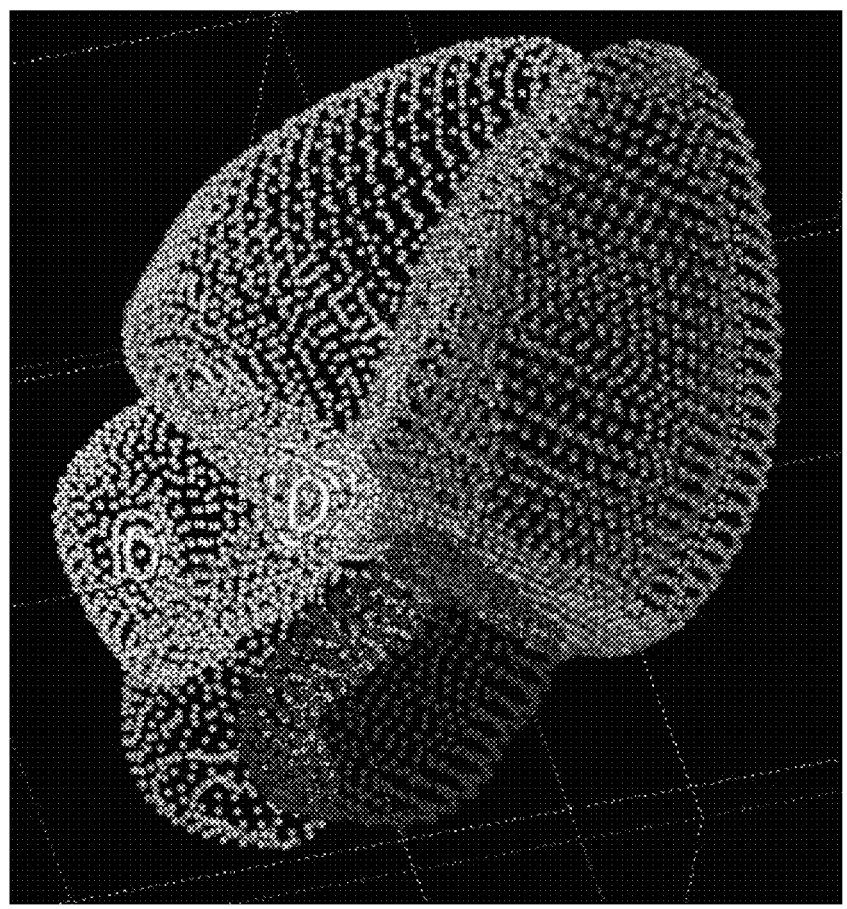
FIG. 19 is an embodiment illustrating a model grid classification according to some embodiments of the present disclosure.

In 740, control points on the plurality of reference models may be determined. The operation 740 may be implemented by the average model generation unit 640 of the model construction module 440 based on the plurality of reference models after the image registration and the chamber edge labelling. In some embodiments, the axis of each chamber may be determined based on the image registration results and the chamber edge labelling information of the plurality of reference models. The axis may be the direction of the line connecting any two designated points on the chamber. For example, the axis may be a long axis formed by a line connecting the two points of the farthest apart in the chamber. In some embodiments, the labelled chamber edges of the plurality of reference models may be extracted separately, each chamber may be sliced along the cross-section direction of the determined axis on each chamber, and a dense point set may be formed at the edge of the slice based on the cross-section and the curved surface features to determine a point model of the average model (as shown in FIG. 19). In some embodiments, the control points on each chamber may be determined according to the point model. The control points may be a subset of the point set on the point model. For example, if the subset is larger, the grid model may be larger, the computation amount during the heart segmentation process may be greater, and the segmentation result may be better. If the selected subset is smaller, the grid model may be smaller, the computation amount during the heart segmentation process may be smaller, and the segmentation speed may be faster. In some embodiments, the number of control points on the chamber may be varied. For example, in the rough segmentation phase, the number of control points may be less so that the edge of the chamber can be quickly positioned. In the precise segmentation phase, the number of control points may be larger, thereby achieving the precise segmentation of the edge of the chamber.

In 750, a heart average grid model may be constructed based on the control points. In some embodiments, in 750, different points may be connected to form a polygonal network based on the relationships between the control points. For example, in some embodiments, a triangle network may be formed by connecting the adjacent control points on adjacent slices. In some embodiments, the average grid model may be obtained by an image deformation algorithm. The image deformation algorithm may include a Point Distribution Model (PDM), an Active Shape Model (ASM), an Active Contour Model (also called Snakes), an Active Appearance Model (AAM), or the like. For example, in some embodiments, the average grid model of the plurality of cardiac reference models may be obtained based on a triangular network constructed by the control points using the ASM computation algorithm (as shown in FIG. 20). In some embodiments, the operation 750 may include performing a weighted average model computation on the control point grid model based on a two-dimensional correlation factor matrix. For example, in the ASM computation, the average model generation unit 640 may perform a weighted average (i.e., $\Sigma F_i * W_i$) to determine an adjustment result of the control point. $F_i$ is the deformation parameter of a chamber, and $W_i$ is the influence coefficient or weight value of the chamber to the control point.

It should be noted that the above descriptions of constructing the average model by the model construction module 440 are merely for convenience of illustration and are not intended to limit the scope of the present disclosure. It should be understood that, for those skilled in the art, after understanding the working principle of the module, it is possible to arbitrarily adjust the order of each operation, or add and remove some operations without depart from the principle. For example, the operation 710 and the operation 720 may be combined. As another example, operations 730-750 may be repeated multiple times. All such variations are within the protection scope of the present disclosure.

Figure 8:
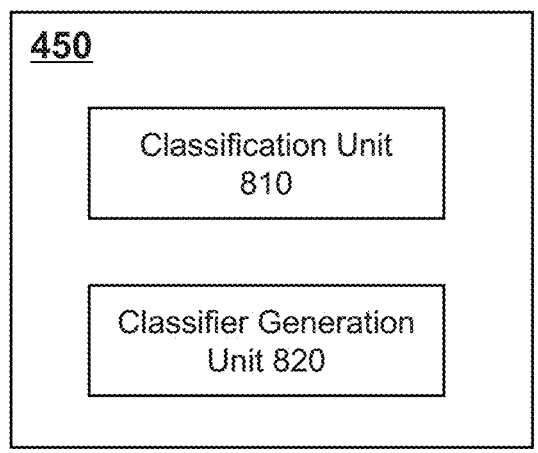
FIG. 8 is a schematic diagram illustrating an exemplary training module according to some embodiments of the present disclosure.

FIG. 8 is a schematic diagram illustrating an exemplary training module according to some embodiments of the present disclosure. The training module 450 may include a classification unit 810 and a classifier generation unit 820. The connection between modules within the training module 440 may be a wired connection, a wireless connection, or a combination thereof. Any module may be local, remote, or a combination thereof.

Figure 22:
FIG. 22 is a diagram illustrating an image edge based on the sharpness classification according to some embodiments of the present disclosure.

The classification unit 810 may be configured to divide the possible chamber edge points on the plurality of reference models or the average model into different chamber categories. The functions may be implemented by the processor 220. In some embodiments, the classification unit 810 may classify the possible edge points on the reference model or the average model according to the chamber category divided by the labelling unit 630 (as shown in FIG. 22). For example, the classification unit 810 may divide the possible edge points near the chamber on the reference model or the average model into ten chamber categories, respectively, that is, the left ventricular margin, the sharp left atrial margin, the left atrial non-sharp edge, the right ventricular sharp margin, the right ventricular non-sharp edge, the right atrial sharp edge, the right atrial non-sharp edge, the aortic margin, the left myocardium sharp edge, and the left myocardial non-sharp edge. The classification may be implemented by various classification algorithms, including but not limited to a Decision Tree classification algorithm, a Bayes classification algorithm, an artificial neural network (ANN) classification algorithm, a K-proximity (kNN), support vector machine (SVM), a classification algorithm based on association rules, an integrated learning classification algorithm, or the like. In some embodiments, the classification unit 810 may divide points near the edge of the chamber into positive samples and negative samples based on the distance between the points and the edge of the chamber. For example, the positive samples may be data points within a certain threshold range from the edge of the chamber, and the negative samples may be data points that are farther away from the edge of the chamber and/or other random positions in the space. In some embodiments, the classification unit 810 may send the classification results or data of the possible edge points of the reference model or the average model to the storage module 430 for storage, or to the classifier generation unit 820 for further processing.

Figure 23:
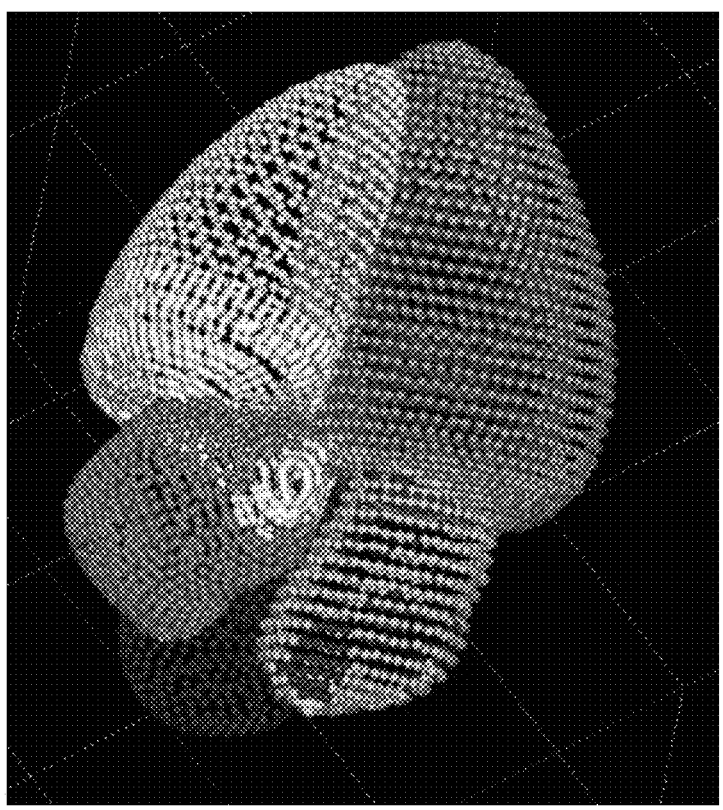
FIG. 23 is a diagram illustrating an exemplary model based on the sharpness classification according to some embodiments of the present disclosure.

The classifier generation unit 820 may be configured to obtain a trained classifier. In some embodiments, the classifier generation unit 820 may perform classifier training on the edge points of the reference model or the average model according to the edge point categories divided by the classification unit 810, to obtain a trained classifier (as shown in FIG. 23). In some embodiments, the classifier generation unit 820 may utilize a PBT training classifier. In some embodiments, after receiving a coordinate point, the trained classifier may output a probability of the coordinate point. The probability may refer to a probability that a point is at the edge of the chamber. In some embodiments, the classifier generation unit 820 may send the trained classifier to the storage module 430 for storage, or to the matching module 460 and/or the adjustment module 470 for computation.

It should be noted that the above descriptions of the training module 450 are for convenience of illustration and are not intended to limit the scope of the present disclosure. It will be understood that those skilled in the art, after understanding the working principle of the module, it is possible to make any combination of the units within the module, or to form a subsystem connected with other units, and make various modifications and changes to the form and details of implementing the module without departing from the principle. For example, the classification unit 810 may perform a chamber division on the plurality of reference models or the average model such that the divided chamber categories are more precise with respect to the labelled chamber categories. All such variations are within the protection scope of the present disclosure.

Figure 9:
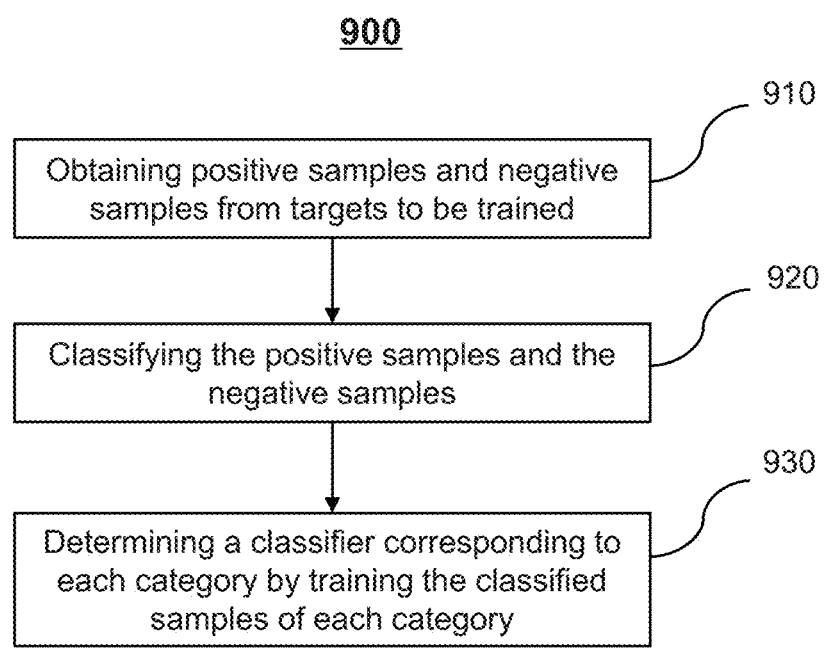
FIG. 9 is a flowchart illustrating an exemplary process for training a classifier according to some embodiments of the present disclosure.

FIG. 9 is a flowchart illustrating an exemplary process for training a classifier according to some embodiments of the present disclosure. In 910, the classification unit 810 of the training module 450 may obtain sample points from the plurality of reference models or the average model. In some embodiments, the training module 450 may extract the edge of the chamber based on the chamber segmentation results on the plurality of reference models or the average model after labelled (as shown in FIG. 22), and take the points within a certain range near the edge of each chamber as positive samples and the points far away from the edge of the chamber and other random positions in the space as negative samples. For example, the range of the edge of the chamber may be 0.1 cm, 0.5 cm, 1 cm, 2 cm, etc.

In 920, the classification unit 810 of the training module 450 may classify the obtained positive sample points and negative sample points. In some embodiments, the training module 450 may classify the positive sample points and the negative sample points into different chamber categories according to a classification algorithm. In some embodiments, the positive samples may be the points within a certain range of the edge of the average model, and the negative samples may be the points outside the certain range of the edge of the average model. In some embodiments, the certain range of the edge of the average model may be set to zero, and the positive samples may be the edge points of the average model. In some embodiments, the positive samples may be classified based on the sharpness and the location of the sample points. In some embodiments, the location of the sample points may refer to the chambers of the positive samples and the negative samples. For example, the training module 450 may divide the positive sample points and the negative sample points into ten chamber categories according to the labelled chamber categories, that is, the left ventricular margin, the sharp left atrial margin, the left atrial non-sharp edge, the right ventricular sharp margin, the right ventricular non-sharp edge, the right atrial sharp edge, the right atrial non-sharp edge, the aortic margin, the left myocardium sharp edge, and the left myocardial non-sharp edge. The classification method may include a Decision Tree classification algorithm, a Bayes classification algorithm, an artificial neural network (ANN) classification algorithm, a k-proximity (kNN), a support vector machine (SVM), a classification algorithm based on association rules, an integrated learning classification algorithm, etc. The Decision Tree classification algorithm may include ID3, C4.5, C5.0, CART, PUBLIC, SLIQ, a SPRINT algorithm, or the like. The Bayesian classification algorithm may include a naive Bayesian algorithm, a TAN algorithm (tree augmented Bayes network), or the like. The artificial neural network classification algorithm may include a back propagation (BP) network, a radial basis RBF network, a Hopfield network, a random neural network (for example, Boltzmann machine), a competitive neural network (for example, Hamming network, self-organizing map network, etc.), or the like. The classification algorithm based on association rules may include CBA, ADT, CMAR, or the like. The integrated learning classification algorithms may include Bagging, Boosting, AdpBoosting, PBT, etc.

In 930, the training module 450 may obtain the trained classifier. In some embodiments, the classifier generation unit 820 of the training module 450 may train the sample point categories through the PBT algorithm and obtain one or more trained classifiers (as shown in FIG. 23). The PBT may include a two-level PBT algorithm or a multi-level PBT algorithm. In some embodiments, the classifier may include one or more classifiers (also referred to as "first classifiers") trained by taking the points within a certain range of the edge of the plurality of reference models or the average model as the positive samples. In some embodiments, the classifier may include one or more classifiers (also referred to as "second classifiers") trained by taking the points within a certain range of the edge of the image to be processed as the positive samples.

It should be noted that the above descriptions of the process of training the classifier by the training module 450 are merely for convenience of illustration and are not intended to limit the scope of the present disclosure. It should be understood that, for those skilled in the art, after understanding the working principle of the module, it is possible to arbitrarily adjust the order of each operation, or add and remove some operations without departing from the principle. For example, the operation 910 and the operation 920 may not distinguish the positive samples and the negative samples, and directly classify all the points near the edge of the chamber. As another example, the maximum distance between the edge of the chamber and the positive sample points and/or the negative sample points may be 2 cm. All such variations are within the protection scope of the present disclosure.

Figure 10:
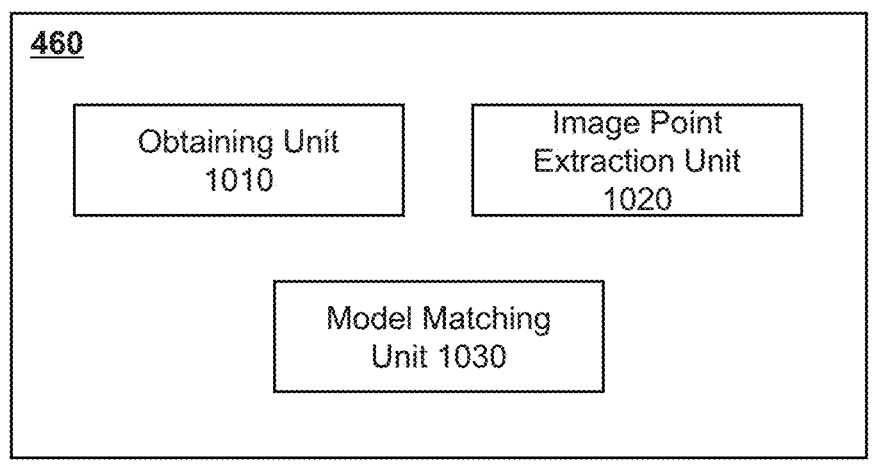
FIG. 10 is a schematic diagram illustrating an exemplary model matching module according to some embodiments of the present disclosure.

FIG. 10 is a schematic diagram illustrating an exemplary model matching module according to some embodiments of the present disclosure. As shown in FIG. 10, the matching module 460 may include an obtaining unit 1010, an image point extraction unit 1020, and a model matching unit 1030. The connection between the units of the matching module 460 may be a wired connection, a wireless connection, or a combination thereof. Any unit may be local, remote, or a combination thereof.

The obtaining unit 1010 may obtain an image. The obtained image may be an image to be processed. In some embodiments, the image may be a reconstructed image based on image data. The reconstructed image may be obtained from other modules of the processing device 130. For example, the reconstructed image may be obtained by the obtaining unit 1010 from the image reconstruction module 420. As another example, the reconstructed image may be stored in the storage module 430 after being reconstructed by the image reconstruction module 420. The reconstructed image may be obtained from the storage module 430. In some embodiments, the image may be an image inputted to the system via an external device. For example, the external device may input the image into the system via the communication port 250. In some embodiments, the obtaining unit 1010 may obtain an average model. The average model may be a three-dimensional cardiac average grid model generated by the average model generation unit 640. In some embodiments, the obtaining unit 1010 may obtain the first classifier trained by the training module 450. The first classifier may be obtained based on a point classifier. The image feature may be related to sharpness and location.

In some embodiments, the obtaining unit 1010 may obtain parameters required when the model matching module 460 performs an image matching. For example, the obtaining unit 1010 may obtain parameters for the Generalized Hough Transform. In some embodiments, the parameters of the Generalized Hough Transform may be obtained based on the three-dimensional average grid model and the control points of its chamber edge. For example, the offset vector (hereinafter referred to as a gradient vector) corresponding to the control points of each gradient direction may be obtained by determining the centroid of the edge of the average model, and computing the offset of all control points on the edge of the average model relative to the centroid and the gradient direction relative to the centroid. In some embodiments, the average model may be placed in an x-y-z coordinate system, and the coordinates of each gradient vector in the x-y-z coordinate system may be determined. In some embodiments, the coordinates of each gradient vector may be converted to coordinates in a polar coordinate system. Specifically, an intersection angle of the projection of the gradient vector in the x-y plane and the x coordinate axis may be taken as a first angle θ, ranging from −180 degrees to 180 degrees. An intersection angle of the gradient vector and the x-y plane may be taken as a second angle φ, ranging from −90 degrees to 90 degrees. In some embodiments, the two angles θ and φ representing the gradient vector may be discretized to obtain a table (also referred to as R-table) as described below. In some embodiments, the offset on the R-table may be scaled or rotated with different angles to examine the shapes of different sizes or different angles.

| angles of the gradient φ, θ | the offset of the corresponding points |
|---|---|
| 0, 90 | (x0,y0,z0), (x3,y3,z3), ... |
| 0, 80 | (x2,y2,z2), (x5,y5,z5), ... |
| ... | ... |
| 10, 90 | (x4,y4,z4), (x6,y6,z6), ... |
| ... | ... |

The image point extraction unit 1020 may obtain an edge probability map of the image to be processed. Specifically, in some embodiments, the image point extraction unit 1020 may compute a probability that each point on the image to be processed is a chamber edge by inputting the coordinates of the points on the image to be processed into the classifier obtained by the obtaining unit 1010. Thr image point extraction unit 1020 may then obtain an edge probability map of the image to be processed according to a probability distribution of each point. In some embodiments, the edge probability map may include a grayscale gradient map, a color gradient map (as shown in FIG. 24), or the like. In some embodiments, the image point extraction unit 1020 may determine the point(s) on the edge probability map whose probability value is greater than a certain threshold as first edge point(s). The threshold may be any real number between 0-1, for example, 0.3, 0.5, or the like.

Figure 25:
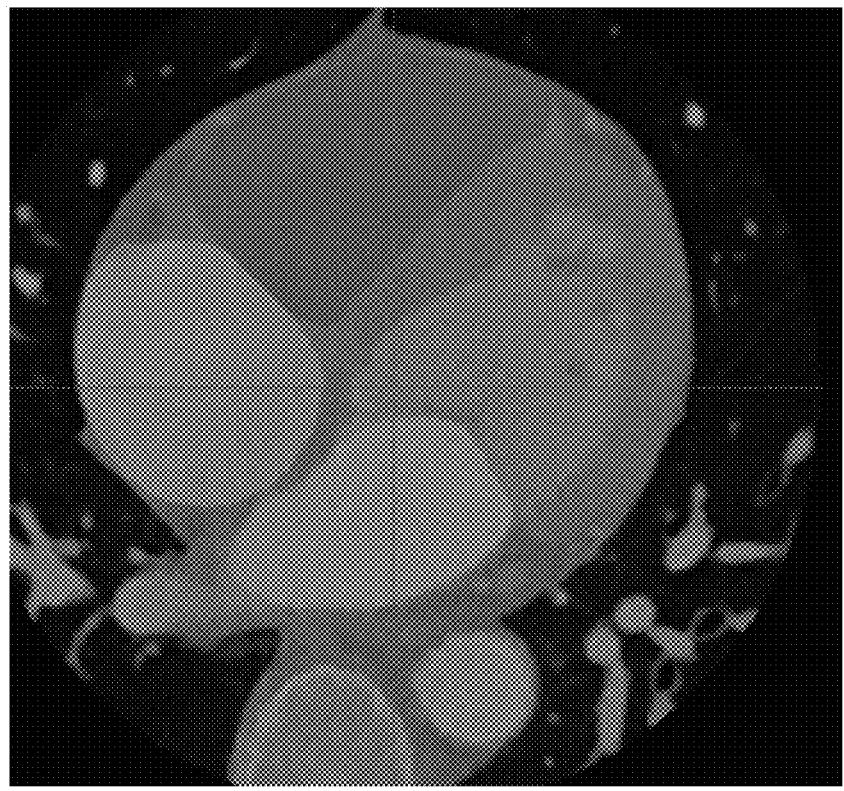
FIG. 25 is a diagram illustrating an average grid model and an image matching after Hough transform according to some embodiments of the present disclosure.

The model matching unit 1030 may match the average model to the image to be processed. In some embodiments, the model matching unit 1030 may match the average model to the edge probability map of the image to be processed by the weighted Generalized Hough Transform. The weighted Generalized Hough Transform may include obtaining all possible edge reference points on the image to be processed according to the first edge point and the R-table, determining a probability accumulation value of all the edge reference points using a weighted accumulation algorithm, and determining the edge reference point with the largest probability accumulation value as the centroid of the image. The transformation parameter of the model centroid to the image centroid may be used as the transformation parameter of the model. The edge reference points may be obtained by performing a coordinate transformation on the first edge point of the image to be processed according to the parameters in the R-table. The weighted accumulation may be a process of accumulating the first edge point probabilities corresponding to the same edge reference points (referring to the behavior that the first edge points fall to the same edge reference points after the parameters of the R-table are offset). According to the obtained image centroid, the model centroid may be transformed to a position coincident with the image centroid based on the transformation parameter. The transformation parameter may include a rotation angle, a scaling ratio, or the like. In some embodiments, the model matching unit 1030 may perform an operation (such as rotate, scale, or the like) on the points of the model according to the determined transformation parameter, thereby determining a model matched with the image to be processed (as shown in FIG. 25).

It should be noted that the above descriptions of the matching module 460 are merely for convenience of illustration and are not intended to limit the scope of the present disclosure. It will be understood that those skilled in the art, after understanding the working principle of the module, it is possible to make any combination of the units within the module, or to form a subsystem connected with other units, and make various modifications and changes to the form and details of implementing the module without departing from the principle. For example, the image point extraction unit 1020 may be removed, and the edge probability map of the image to be processed may be determined by the training module 450. All such variations are within the protection scope of the present disclosure.

Figure 11:
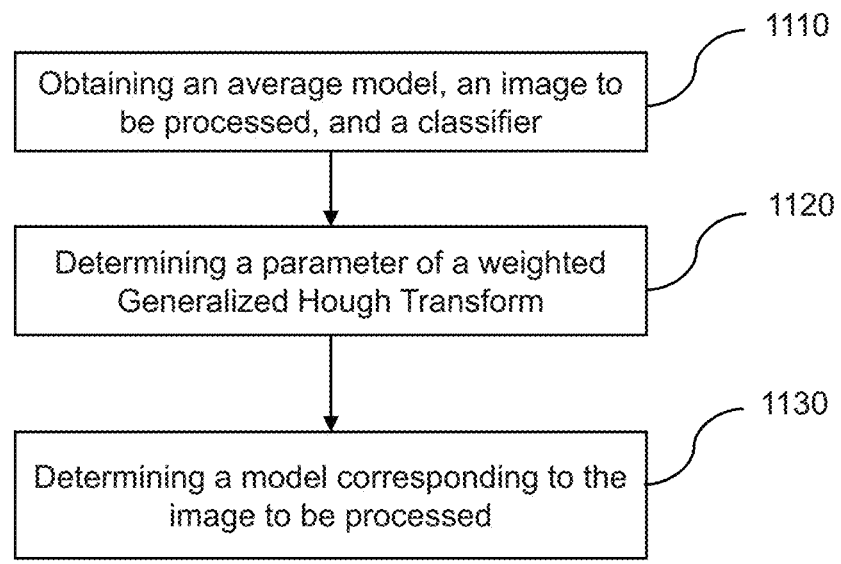
FIG. 11 is a flowchart illustrating an exemplary process for matching an average model and a reconstructed image according to some embodiments of the present disclosure.

FIG. 11 is a flowchart illustrating an exemplary process for matching an average model and a reconstructed image according to some embodiments of the present disclosure. In 1110, an average model, an image to be processed, and a trained second classifier may be obtained. In some embodiments, the average model may be a three-dimensional cardiac average grid model obtained by the average model generation unit 640 based on a plurality of reference models using an image model construction algorithm. The image model construction algorithm may include a Point Distribution Model (PDM), an Active Shape Model (ASM), an Active Contour Model (also called Snakes), an Active Appearance Model (AAM), or the like. The operation 1110 may be implemented by the obtaining unit 1010. In some embodiments, the image to be processed may be an image reconstructed by the image reconstruction module 420. In some embodiments, the operation 1110 may obtain an R-table based on the average model.

In 1120, a parameter of a Generalized Hough Transform may be determined. In some embodiments, the operation 1120 may include obtaining first edge points of the image to be processed based on an edge probability map of the image to be processed. The first edge points may be points on the edge probability map of the image to be processed having a probability greater than a certain threshold, for example, the probability may be 0.3. In some embodiments, the edge probability map may be obtained by inputting the coordinates of the points on the image to be processed into the classifier obtained by the obtaining unit 1010, computing a probability that the points on the image to be processed are on the edge of the chamber, and determining a probability distribution of each point. In some embodiments, the angles θ and φ corresponding to the gradient direction of the first edge points on the image to be processed may be computed. The offset of the first edge points may be determined according to the R-table. The difference between the coordinate value of the first edge points and all the corresponding offsets may be used as the coordinate values of all the possible edge reference points. In some embodiments, a weighted accumulation may be performed on all the edge reference points according to the number of voting the edge reference points and the probability value corresponding to the first edge points. The weighted accumulation may be an accumulation of the probabilities of the first edge points corresponding to the same edge reference points. In some embodiments, the parameter in the R-table corresponding to the edge reference point with the largest probability accumulation value may be used as a transformation parameter of the image to be processed. The transformation parameter may include a rotation angle, a scaling ratio, or the like. The weighted accumulation algorithm may be represented according to Equation (1):

$$S(\theta, \varphi, r) = \underset{j}{\operatorname{argmax}} \sum_{i} p_i \sigma \quad (1)$$

Wherein, i is the index of the first edge point; j is the index of the possible edge reference point voted on the voting image; p is the probability value of each first edge point; and σ is a 0, 1 binary function. When the i-th first edge point has a voting contribution at the j-th possible edge reference point, the value is 1. Alternatively, if the i-th first edge point does not have a voting contribution at the j-th possible edge reference point, the value is 0.

In 1130, the model corresponding to the image to be processed may be obtained. In some embodiments, the first edge point on the image to be processed may be transformed based on the determined weighted Generalized Hough Transform parameter. For example, according to the angle and scaling ratio in the R-table corresponding to the edge reference points, the coordinates of the first edge point on the image to be processed may be transformed, and the information on the average model may be mapped to the image to be processed to obtain the image to be processed corresponding to the average grid model.

Figure 12:
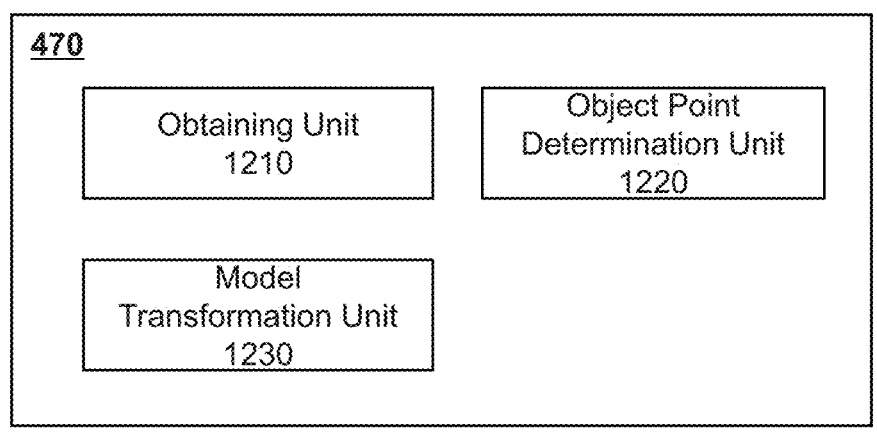
FIG. 12 is a schematic diagram illustrating an exemplary adjustment module according to some embodiments of the present disclosure.

FIG. 12 is a schematic diagram illustrating an exemplary adjustment module according to some embodiments of the present disclosure. As shown in FIG. 12, the adjustment module 470 may include an obtaining unit 1210, an object point determination unit 1220, and a model transformation unit 1230. The connection between the units of the adjustment module 470 may be a wired connection, a wireless connection, or a combination thereof. Any unit may be local, remote, or a combination thereof.

The obtaining unit 1210 may obtain the model and the trained second classifier. Specifically, the obtaining unit 1210 may obtain coordinate data of second edge points on the model. In some embodiments, the second edge points of the model may be the control points on the model. In some embodiments, the obtaining unit 1210 may obtain the second classifier trained by the training module 450. The classifier may include 10 classifiers trained using the PBT classification algorithm based on ten chamber categories (e.g., the left ventricular edge, the sharp edge of the left atrium, the non-sharp edge of the left atrium, the sharp edge of the right ventricle, the non-sharp edge of the right ventricle, the sharp edge of the right atrium, the non-sharp edge of the right atrium, the edge of the aorta, the sharp edge of the left myocardium, and the non-sharp edge of the left myocardium) divided by chamber and edge sharpness. In some embodiments, the grayscale changes on the inner and outer sides of a chamber edge may not be obvious and the sharpness degree may be low. Therefore, the chamber edge may not be classified according to the sharpness degree. In some embodiments, the obtaining unit 1210 may obtain the model processed by the model transformation unit 1230.

The object point determination unit 1220 may determine the object points corresponding to the second edge points on the model. Taking a second edge point on the model as an example, the object point determination unit 1220 may determine a plurality of candidate points around the second edge point of the model. In some embodiments, the object point determination unit 1220 may input the determined plurality of candidate points around the second edge point of the model into the classifier obtained by the obtaining unit 1210. The object point determination unit 1220 may determine probabilities of the second edge point of the model and the plurality of candidate points corresponding to the edge of the image. The object point determination unit 1220 may determine an object point of the second edge point of the model based on the probabilities. In some embodiments, the object point determination unit 1220 may determine the object points for all the second edge points on the model.

The model transformation unit 1230 may adjust the model. In some embodiments, the model transformation unit 1230 may adjust the position of the model edge point(s) based on the object point(s) determined by the object point determination unit 1220. The adjustment may include a similarity transformation, a segmentation affine transformation, an energy function based micro-variation, or the like. In some embodiments, the model transformation unit 1230 may repeatedly adjust the model. Each adjustment may require re-determining the object point. In some embodiments, the model transformation unit 1230 may determine whether a predetermined condition is satisfied after the adjustment. For example, the predetermined conditions may include whether the number of model adjustments reaches a certain threshold. If the number of model adjustments reaches the certain threshold, a precisely matched model may be output. If the number of model adjustments is less than the certain threshold, a signal may be sent to the object point determination unit 1220, the determination of the object point may be performed again, and the model edge point may be transformed again by the model transformation unit 1230. In some embodiments, the model transformation unit 1230 may obtain a precisely adjusted heart chamber model. The precisely adjusted heart chamber model may be very close to the real heart.

It should be noted that the descriptions of the adjustment module 470 are merely for convenience of illustration and are not intended to limit the scope of the present disclosure. It will be understood that those skilled in the art, after understanding the working principle of the module, it is possible to make any combination of the units of the module, or to form a subsystem connected with other units, and make various modifications and changes to the form and details of implementing the module without departing from the principle. For example, the model transformation unit 1230 may preset the number of cycles instead of determining the number of cycles of the adjustment module 470 based on the threshold determination. All such variations are within the protection scope of the present disclosure.

Figure 13:
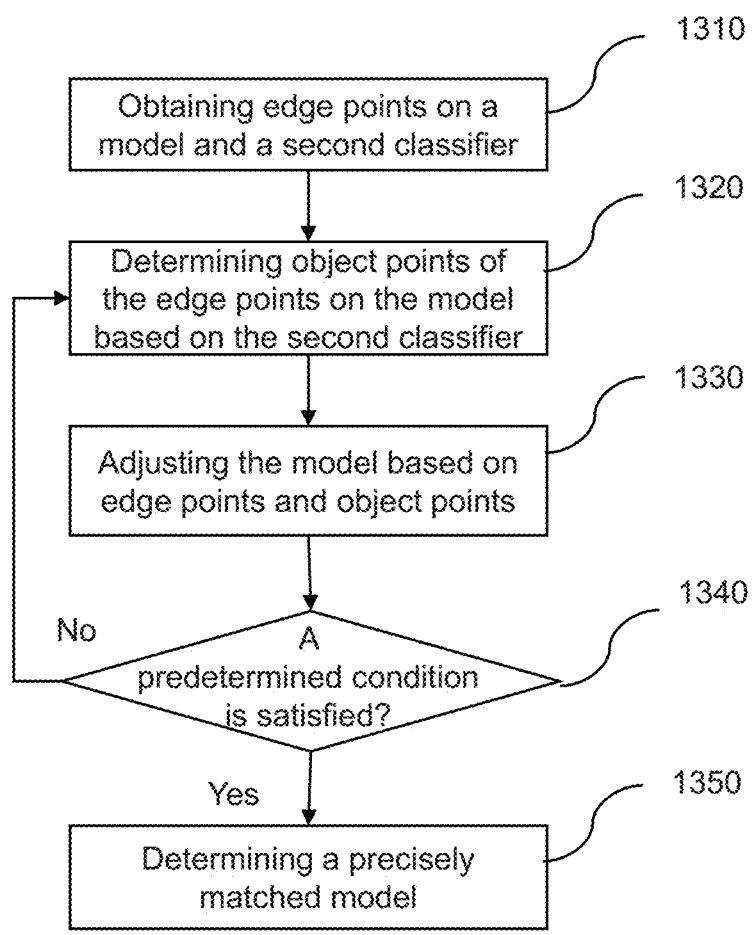
FIG. 13 is a flowchart illustrating an exemplary process for adjusting a model according to some embodiments of the present disclosure.

FIG. 13 is a flowchart illustrating an exemplary process for adjusting a model according to some embodiments of the present disclosure. In 1310, the second edge points on the model and the trained classifier may be obtained. In some embodiments, the classifiers obtained by the obtaining unit 1210 and by the obtaining unit 1010 may not be the same type. The classifier obtained by the obtaining unit 1010 may be trained by taking the points within a certain range of the edge of the average grid model as the positive samples by the training module 450. The classifier obtained by the obtaining unit 1210 may be trained by taking the points within a certain range of the edge of the image to be processed as the positive samples. In some embodiments, the classifier obtained by the obtaining unit 1010 may be a first classifier, and the classifier obtained by the obtaining unit 1210 may be a second classifier.

In 1320, object points of the second edge points on the model may be determined based on the second classifier. In some embodiments, the operation 1320 may include inputting candidate points within a certain range of the second edge points of a model into the second classifier, and obtain a probability that the candidate points within the certain range of the second edge points of the model belongs to the edge of the image. In some embodiments, the object point determination unit 1220 may determine the object points of the second edge points of the model based on the determined probabilities. In some embodiments, the second edge points on the model may be the inner edge points of the model (the inner edge of the second edge), corresponding to the inner edge of the first edge of the cardiac image data. The process of transforming the second edge points to the object points may be a process of precisely matching the inner edge of the chamber on the model with the inner edge of the first edge of the cardiac image data. The inner edge may refer to an edge for precise matching. When the process disclosed in the present disclosure is used for other objects, organs or tissues, the inner edge may not be necessarily geometrically internal and not be necessarily inside the outer edge.

In 1330, the second edge points on the model may be transformed into the object points based on the determined object points. In some embodiments, the operation 1330 may transform the second edge points on the model using multiple transformation algorithms. For example, the model transformation unit 1230 may apply the similarity change and the affine transformation to correct the second edge points on the model.

In 1340, whether the adjustment result satisfies the predetermined condition may be determined. In some embodiments, the predetermined condition may be whether the number of adjustments reaches a certain threshold. In some embodiments, the threshold may be adjustable. If the number of adjustments reaches the certain threshold, the process may proceed to operation 1350, and the precisely matched model may be outputted. If the number of adjustments is less than the certain threshold, the process may return to operation 1320, and the object point corresponding to the new model edge point may be determined by the object point determination unit 1220 based on the new model edge point.

Figure 14:
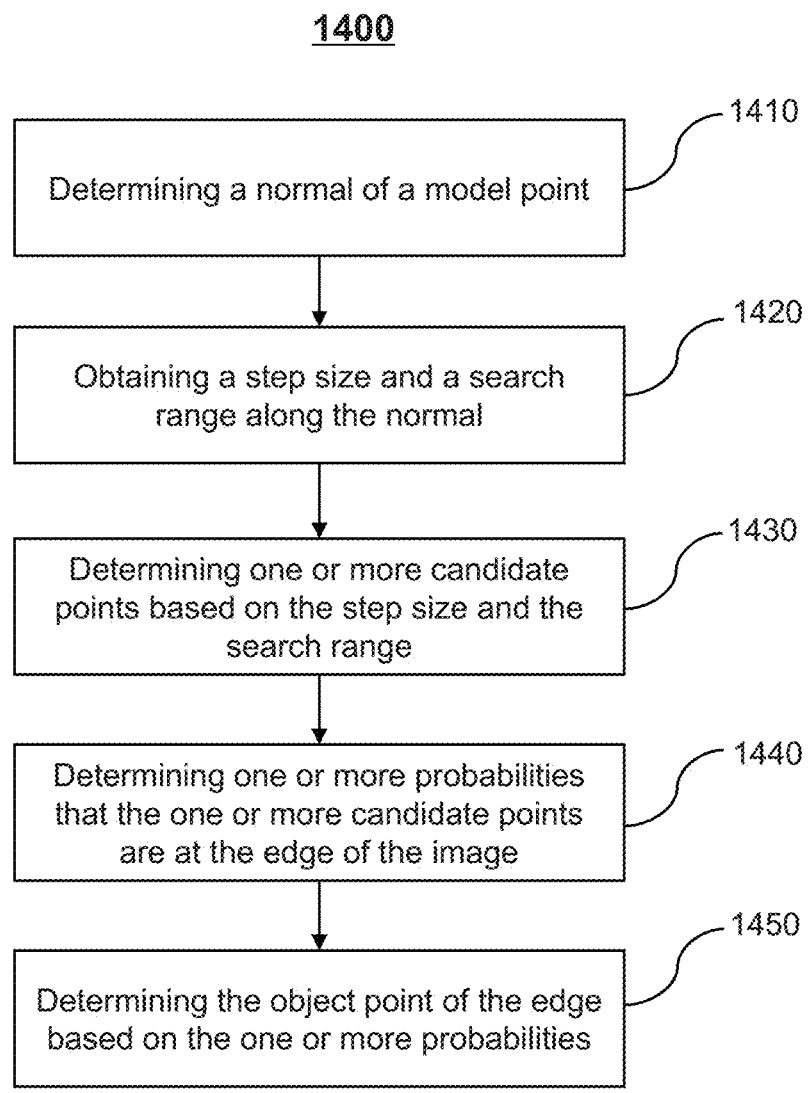
FIG. 14 is a flowchart illustrating an exemplary process for determining an object point according to some embodiments of the present disclosure.

FIG. 14 is a flowchart illustrating an exemplary process for determining an object point according to some embodiments of the present disclosure. The process 1400 may be implemented by the object point determination unit 1220. FIG. 14 is a process for determining an object point of an edge point on the average model, but those skilled in the art should understand that the process may be used to determine a plurality of object points corresponding to a plurality of edge points. In some embodiments, the process 1400 may be an embodiment of operation 1320.

In 1410, a normal of an average model edge point may be determined. In some embodiments, the direction of the normal may be directed from the inside of the average model to the outside of the average model. The specific normal acquisition process may be found elsewhere in the present disclosure, for example, process 1500 and the description thereof.

In 1420, the step size and the search range along the direction of the normal of the average model edge point may be obtained. In some embodiments, the step size and the search range may be predetermined values. In some embodiments, the step size and the search range may be inputted by a user. For example, the user may input the step size and the search range into the processing device 130 via the communication port 250 using an external device. In some embodiments, the search range may be a line segment starting from the edge point of the model and along at least one of two directions (toward the outer side or the inner side of the model) of the normal.

In 1430, one or more candidate points may be determined based on the step size and the search range. For example, if the search range is 10 cm and the step size is set to 1 cm, 10 points in both directions along the normal may be determined, that is, a total of 21 candidate points (including the edge point) may be determined. In some embodiments, the step size and the number of steps may be determined, and the candidate points may be determined based on the step size and the number of steps. For example, if the step size is set to 0.5 cm and the number of steps is set to 3, 3 points in both directions along the normal may be determined and the farthest candidate point distant from the edge point may be 1.5 cm, i.e., a total of 7 candidate points.

In 1440, probabilities that the one or more candidate points correspond to a range of the image edges may be determined. In some embodiments, the second classifier may be trained by taking the points within a certain range of the image edge as the positive samples. The certain range may be a predetermined value set by the machine or the user. For example, the predetermined value may be 1 cm.

In 1450, one of the one or more candidate points may be determined as an object point based on the probabilities that the one or more candidate points correspond to the certain range of the image edges. In some embodiments, the object point may be obtained according to Equation (2):

$$F_i = \max(P_i - \lambda * d_i^2) \tag{2}$$

Wherein, $P_i$ is the probability that the candidate point corresponds to a certain range of the image edge; $d_i$ is the European distance of the candidate point and the edge point of the average model; $\lambda$ is the weight, which is a constant used to balance the relationship between the distance and the probability.

In some embodiments, a plurality of object points of the plurality of model edge points may be determined based on the process 1400, and then the plurality of model edge points and the model may be transformed according to the plurality of object points. The specific transformation process can be seen, for example, FIG. 16 and description thereof.

Figure 15:
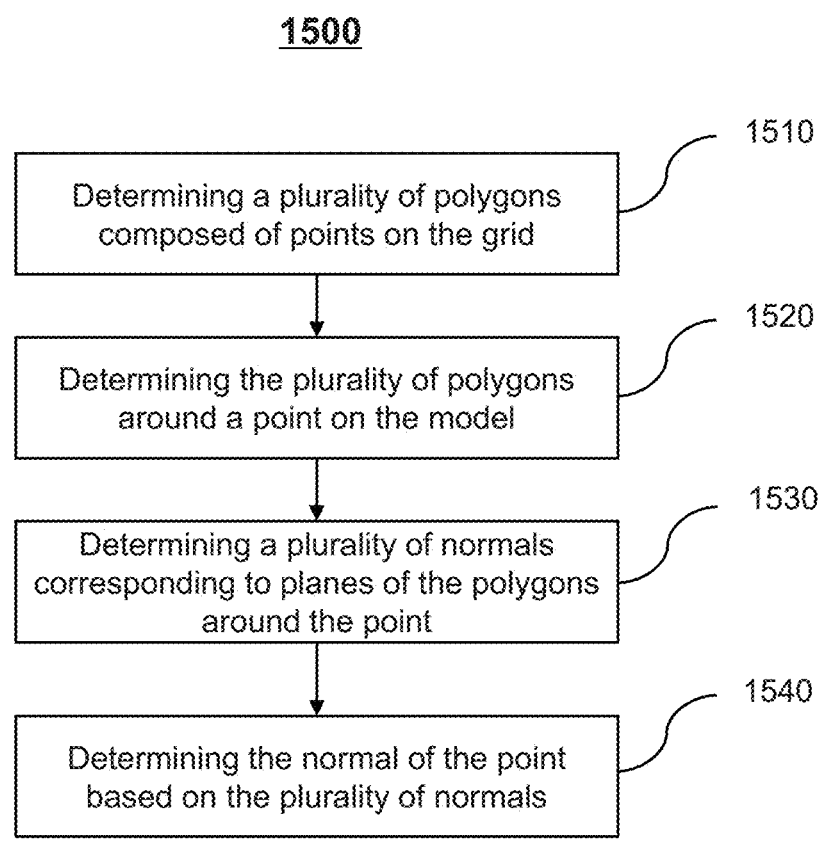
FIG. 15 is a flowchart illustrating an exemplary process for determining a normal of an average model edge point according to some embodiments of the present disclosure.

FIG. 15 is a flowchart illustrating an exemplary process for determining a normal of an edge point according to some embodiments of the present disclosure. In some embodiments, the process 1500 may be an embodiment of operation 1420.

In 1510, a plurality of polygons may be determined based on a plurality of edge points of the average model. In some embodiments, the plurality of polygons may be formed by connecting the plurality of edge points. The plurality of polygons may have the shape of a triangle, a quadrangle, a polygon, or the like. In some embodiments, the process of determining the plurality of polygons according to the plurality of edge points may also be referred to as a gridization process. The plurality of polygons may be referred to as grids, and the plurality of edge points may be referred to as nodes. In some embodiments, the average model surface may have formed the plurality of polygons corresponding to the average model edge points, and operation 1510 may be omitted.

In 1520, a plurality of polygons adjacent to an average model edge point may be determined.

In 1530, a plurality of normals corresponding to planes of the plurality of polygons may be determined. In some embodiments, the directions of the plurality of normals corresponding to planes of the plurality of polygons may be located at the same side (outside or inside the average model). In some embodiments, the plurality of normal vectors corresponding to the planes of the plurality of polygons may be unit vectors.

In 1540, the normal of the edge point may be determined based on the plurality of normals. In some embodiments, the plurality of normal vectors corresponding to the plurality of polygons may be added or averaged.

Figure 16:
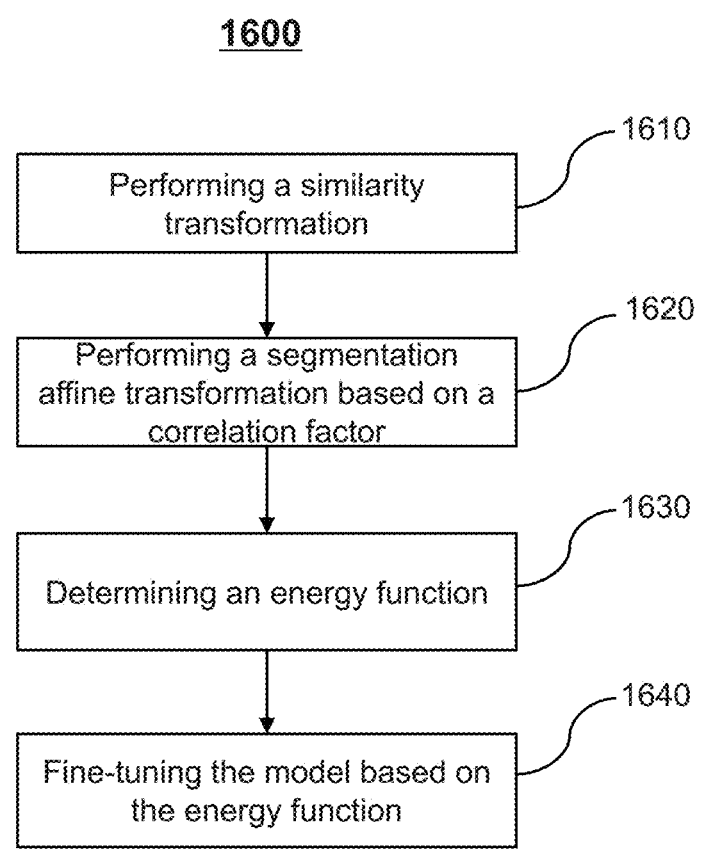
FIG. 16 is a flowchart illustrating an exemplary process for transforming an average model edge point according to some embodiments of the present disclosure.

FIG. 16 is a flowchart illustrating an exemplary process for transforming average model edge points according to some embodiments of the present disclosure. In some embodiments, the process 1600 may be implemented by the model transformation unit 1230.

In 1610, a similarity transformation may be performed on the average model edge points. For example, a grid composed of the average model edge points may be taken as a whole, and the average model may be transformed (e.g., including translation, rotation, scaling, or the like) according to the direction of the object point determined by the edge points of the chamber.

In 1620, a segmentation affine transformation may be performed on the average model edge points. In some embodiments, the grid composed of the average model edge points may be divided according to a certain rule. For example, the heart model may be divided according to the heart chambers. As shown in FIG. 24, the model grid may be divided into six parts according to the chambers, that is, the left ventricle, the left atrium, the right ventricle, the right atrium, the aorta, and the left myocardium. In some embodiments, the segmentation affine transformation may refer to the affine transformation of the grids of the divided parts. The affine transformation may refer to performing a motion transformation and a shape transformation on a plurality of nodes of each part. In some embodiments, the average model edge points may be affected by the plurality of chambers. The influence of different chambers on the average model edge points may be expressed in the form of a correlation factor. When an affine transformation is performed, the average model edge point may be transformed toward the object point. During the transformation process, the average model edge points may be affected by the plurality of chambers. The correlation factor may become the weight value of the transformation parameter (such as a mobile displacement, a deformation ratio, etc.). According to the object points corresponding to the edge points and the correlation factor, the model transformation unit 1230 may transform the edge points on the average model multi-segment grid to the corresponding positions by performing a segmentation affine transformation.

In 1630, an energy function based micro-variation may be performed on the average model edge points. In some embodiments, the energy function may be expressed as:

$$E = E_{ext} + \Sigma_c \alpha_c * E_{int}^c \quad (3)$$

Wherein, $E_{ext}$ is an external energy, indicating a relationship between the current point and the object point; $E_{int}$ is an internal energy, indicating a relationship between the current point and an edge point of the average model; a is the weight, used to balance the internal and external energies, different chambers having different weights; c denotes each chamber. If the current point is close to the object point and close to an edge point of the average model, the energy function may be minimum, that is, the optimal coordinate point may be obtained. The smaller the total energy E is, the more precise the result may be.

The external energy function may be expressed as:

$$E_{ext} = \sum_i w_i \left( \frac{\nabla I(v_i^t)}{\|\nabla I(v_i^t)\|} * (v_i^t - v_i) \right)^2 \quad (4)$$

Wherein, i refers to each point; $w_i$ refers to the weight of each point (i.e., the reliability of the point); $v_i$ is the coordinate of the current point, $v_i^t$ is the point examined by the PBT classifier, $\nabla I/(v_i^t)$ is the gradient (or vactor) of the point, and $\|\nabla I/(v_i^t)\|$ is the numeral value of the gradient.

The internal energy function may be expressed as:

$$E_{int} = \Sigma_i \Sigma_j \Sigma_k w_{i,k}((v_i - v_j) - T_{affine,k}(m_i - m_j))^2 \quad (5)$$

Wherein, i refers to each point; j is the neighborhood of point i ($v_i - v_j$ corresponding to the edges of each triangle at the current point position); $w_{i,k}$ is the correlation factor (i.e., the factor of each chamber k to the current point i); $m_i$, $m_j$ are the point on the average model (determined by PDM/ASM); $m_i - m_j$ corresponds to the edges of each triangle of the mesh average model, $T_{affine,k}$ is the transformation relationship obtained by the affine transformation PAT of each chamber k. The point coordinates $v_i$ are three-dimensional.

After the weighted Generalized Hough Transform, the model adjustment, and the model transformation, the precisely matched models and images may be obtained. As shown in FIG. 25, the heart chambers of the precisely matched model may be segmented out clearly and precisely.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure Moreover, those skilled in the art will appreciate that the aspects of the present disclosure may be illustrated and described by a number of patentable categories or conditions including any new and useful combinations of processes, machines, products or substances, or any new and useful improvements to them. Accordingly, various aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". In addition, the aspects of the present disclosure may be embodied as a computer product located on one or more computer readable media, including a computer readable program code.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method, composing:
obtaining image data;
reconstructing an image based on the image data, wherein the image includes one or more first edges;
obtaining a model, wherein the model includes one or more second edges corresponding to the one or more first edges;
matching the model and the image based on the one or more first edges and the one or more second edges; and
adjusting the one or more second edges of the model based on the one or more first edges by:
determining a reference point on each of the one or more second edges, including:
obtaining a point on an inner edge of the each of the one or more second edges as the reference point;
determining an object point corresponding to the reference point; and
adjusting the each of the one or more second edges of the model based on the object point.

2. The method of claim 1, wherein the determining the object point corresponding to the reference point includes:
determining one or more candidate points within a certain range of the reference point;
determining probabilities that the one or more candidate points correspond to the one or more first edges; and
determining the object point based on the probabilities that the one or more candidate points correspond to the one or more first edges.

3. The method of claim 2, wherein the determining one or more candidate points within a certain range of the reference point includes:
determining a normal of the reference point;
obtaining a step size and a search range; and
determining the one or more candidate points along the normal based on the step size and the search range.

4. The method of claim 3, wherein the determining the normal of the reference point includes:
determining one or more polygon grids adjacent to the reference point;

determining one or more normals corresponding to the one or more polygon grids; and determining the normal of the reference point based on the one or more normals corresponding to the one or more polygon grids.

5. The method of claim 2, wherein the determining probabilities that the one or more candidate points correspond to the one or more first edges includes:

obtaining a first classifier; and determining the probabilities that the one or more candidate points correspond to the one or more first edges based on the first classifier.

6. The method of claim 5, wherein the obtaining the first classifier includes:

obtaining a point classifier, wherein the point classifier classifies a plurality of points of the first edge based on image features related to sharpness and location;

obtaining the plurality of classified points by the point classifier, wherein at least a portion of the plurality of classified points are within a certain range of the first edge;

determining a plurality of classified points within the certain range of the first edge as positive samples;

determining a plurality of classified points outside the certain range of the first edge as negative samples;

classifying the positive samples and the negative samples; and obtaining the first classifier based on the classified positive samples and the classified negative samples.

7. The method of claim 1, wherein the adjusting the each of the one or more second edges of the model based on the object point includes:

performing at least one of a similarity transformation, a segmentation affine transformation, or an energy function based micro-variation on a position of the reference point on the each second edge of the one or more second edges of the model based on the object point.

8. The method of claim 1, wherein the matching the model and the image includes:

obtaining a second classifier;

performing a weighted generalized Hough transform based on the second classifier; and matching the model and the image based on a result of the weighted generalized Hough transform.

9. The method of claim 8, wherein the obtaining the second classifier includes:

obtaining a plurality of points of the model, wherein at least a portion of the plurality of points are within a certain range of the second edge;

determining a plurality of points within the certain range of the second edge as positive samples;

determining a plurality of points outside the certain range of the second edge as negative samples;

classifying the positive sample and the negative sample based on the sharpness and the location; and obtaining the second classifier based on the classified positive samples and the classified negative samples.

10. The method of claim 1, wherein the model includes a three-dimensional model of a target object.

11. A system, composing:

at least one storage device storing a set of instructions; and at least one processor in communication with the at least one storage device, when executing the stored set of instructions, the at least one processor causes the system to perform operations including:

obtaining image data;

reconstructing an image based on the image data, wherein the image includes one or more first edges;

obtaining a model, wherein the model includes one or more second edges corresponding to the one or more first edges;

matching the model and the image based on the one or more first edges and the one or more second edges; and adjusting the one or more second edges of the model based on the one or more first edges by:

determining a reference point on each of the one or more second edges;

determining an object point corresponding to the reference point; and adjusting the each of the one or more second edges of the model based on the object point, including:

performing at least one of a similarity transformation, a segmentation affine transformation, or an energy function based micro-variation on a position of the reference point on the each second edge of the one or more second edges of the model based on the object point.

12. The system of claim 11, wherein the determining the object point corresponding to the reference point includes:

determining one or more candidate points within a certain range of the reference point;

determining probabilities that the one or more candidate points correspond to the one or more first edges; and determining the object point based on the probabilities that the one or more candidate points correspond to the one or more first edges.

13. The system of claim 12, wherein the determining one or more candidate points within a certain range of the reference point includes:

determining a normal of the reference point;

obtaining a step size and a search range; and determining the one or more candidate points along the normal based on the step size and the search range.

14. The system of claim 13, wherein the determining the normal of the reference point includes:

determining one or more polygon grids adjacent to the reference point;

determining one or more normals corresponding to the one or more polygon grids; and determining the normal of the reference point based on the one or more normals corresponding to the one or more polygon grids.

15. The system of claim 11, wherein the matching the model and the image includes:

obtaining a second classifier;

performing a weighted generalized Hough transform based on the second classifier; and matching the model and the image based on a result of the weighted generalized Hough transform.

16. The system of claim 15, wherein the obtaining the second classifier includes:

obtaining a plurality of points of the model, wherein at least a portion of the plurality of points are within a certain range of the second edge;

determining a plurality of points within the certain range of the second edge as positive samples;

determining a plurality of points outside the certain range of the second edge as negative samples;

classifying the positive sample and the negative sample based on the sharpness and the location; and obtaining the second classifier based on the classified positive samples and the classified negative samples.

17. A non-transitory computer readable medium, comprising at least one set of instructions, wherein when executed by at least one processor of a computing device, the at least one set of instructions cause the at least one processor to effectuate a method comprising:

obtaining image data;

reconstructing an image based on the image data, wherein the image includes one or more first edges;

obtaining a model, wherein the model includes one or more second edges corresponding to the one or more first edges;

matching the model and the image based on the one or more first edges and the one or more second edges; and adjusting the one or more second edges of the model based on the one or more first edges by:

determining a reference point on each of the one or more second edges, including:

obtaining a point on an inner edge of the each of the one or more second edges as the reference point;

determining an object point corresponding to the reference point; and adjusting the each of the one or more second edges of the model based on the object point.

* * * * *